(12) United States Patent
Gupta et al.

(10) Patent No.: US 9,179,409 B2
(45) Date of Patent: Nov. 3, 2015

(54) MULTIPLE ACCESS SCHEME FOR NARROWBAND CHANNELS

(71) Applicant: QUALCOMM Incorporated, San Diego, CA (US)

(72) Inventors: Alok K. Gupta, San Diego, CA (US); Bin Tian, San Diego, CA (US); Ethan Lin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 202 days.

(21) Appl. No.: 13/692,951

(22) Filed: Dec. 3, 2012

(65) Prior Publication Data

US 2014/0153417 A1 Jun. 5, 2014

(51) Int. Cl.
| | |
|---|---|
| H04J 1/16 | (2006.01) |
| H04W 52/02 | (2009.01) |
| H04W 4/00 | (2009.01) |
| H04W 72/08 | (2009.01) |
| H04W 74/04 | (2009.01) |
| H04W 74/00 | (2009.01) |

(52) U.S. Cl.
CPC .......... *H04W 52/0219* (2013.01); *H04W 4/005* (2013.01); *H04W 52/0216* (2013.01); *H04W 72/085* (2013.01); *H04W 74/04* (2013.01); *H04W 52/0229* (2013.01); *H04W 74/006* (2013.01)

(58) Field of Classification Search
CPC . H04W 4/005; H04W 72/085; H04W 74/006; H04W 74/04; H04W 52/0219; H04W 52/0216; H04W 52/0229

USPC ......... 370/252, 328–330, 343–344, 400–401, 370/406, 449–452, 458–460, 480
See application file for complete search history.

(56) References Cited

U.S. PATENT DOCUMENTS

| | | | | |
|---|---|---|---|---|
| 6,697,415 | B1 * | 2/2004 | Mahany ........................ | 375/130 |
| 6,711,122 | B1 * | 3/2004 | Langley et al. ............... | 370/205 |
| 6,973,062 | B1 * | 12/2005 | Han ............................... | 370/335 |
| 7,395,056 | B2 * | 7/2008 | Petermann ................... | 455/422.1 |
| 7,626,918 | B2 * | 12/2009 | Langley et al. ............... | 370/205 |
| 7,873,343 | B2 * | 1/2011 | Gollnick et al. ............ | 455/343.3 |

(Continued)

FOREIGN PATENT DOCUMENTS

WO 2006083021 A1 8/2006

OTHER PUBLICATIONS

International Search Report and Written Opinion—PCT/US2013/071450—ISAEPO—Apr. 9, 2014.

(Continued)

*Primary Examiner* — Kevin Mew
(74) *Attorney, Agent, or Firm* — Liberty E. Mann

(57) ABSTRACT

Methods, systems, and devices for managing wireless communications in a machine-to-machine (M2M) wireless Wide Area Network (WAN). An operating frequency band of the M2M wireless WAN is divided into at least a first frequency channel and a second frequency channel. The first and second frequency channels being used for communications on a reverse link. First channel status information and second channel status information are broadcasted to one or more M2M devices. The first channel status information indicating a status of the first frequency channel. The second channel status information indicating a status of the second frequency channel.

40 Claims, 19 Drawing Sheets

(56) References Cited

U.S. PATENT DOCUMENTS

| | | | |
|---|---|---|---|
| 8,204,004 B2 | 6/2012 | Hamamoto et al. | |
| 8,279,767 B2 | 10/2012 | Kang et al. | |
| 8,280,390 B2 | 10/2012 | Yamada et al. | |
| 2005/0008002 A1* | 1/2005 | Kubler et al. | 370/352 |
| 2008/0170544 A1* | 7/2008 | Tang et al. | 370/329 |
| 2010/0106797 A1 | 4/2010 | Nagaraja | |
| 2010/0130193 A1 | 5/2010 | Li et al. | |
| 2012/0172049 A1* | 7/2012 | Wu et al. | 455/452.1 |
| 2012/0195212 A1* | 8/2012 | Zhang et al. | 370/252 |
| 2013/0094444 A1* | 4/2013 | Lai et al. | 370/328 |
| 2014/0071887 A1* | 3/2014 | Tian et al. | 370/328 |
| 2014/0071953 A1* | 3/2014 | Tian | H04W 72/0406 370/336 |
| 2014/0126548 A1* | 5/2014 | Tian | H04W 68/02 370/335 |
| 2014/0146690 A1* | 5/2014 | Gupta | H04W 4/005 370/252 |
| 2014/0204931 A1* | 7/2014 | Jain | 370/338 |
| 2015/0230245 A1* | 8/2015 | Choi | H04W 72/0446 370/329 |

OTHER PUBLICATIONS

Maiya M., et al., "An improved IEEE 802.11 MAC protocol for wireless ad-hoc networks with multi-channel access capabilities", High Performance Computing and Simulation (HPCS), 2011 International Conference on, IEEE, Jul. 4, 2011, pp. 162-168, XP032040520, DOI: 10.1109/HPCSIM.2011.5999820 ISBN: 978-1-61284-380-3.

* cited by examiner

Time t1

Time t2

Time t1

Time t2

MULTIPLE ACCESS SCHEME FOR NARROWBAND CHANNELS

BACKGROUND

The following relates generally to wireless communication, and more specifically to communications in a machine-to-machine (M2M) wireless wide area network (WAN). Wireless communications systems are widely deployed to provide various types of communication content such as voice, video, packet data, messaging, broadcast, sensor data, tracking data, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

Generally, a wireless multiple-access communications system may include a number of base stations, each simultaneously supporting communication for multiple devices. In some examples, these devices may be sensors and/or meters configured to collect data and transmit this data to an end server via a base station. These sensors and/or meters may be referred to as M2M devices. Base stations may communicate with M2M devices on forward and reverse links. Each base station has a coverage range, which may be referred to as the coverage area of the cell. An M2M device may transmit data to a base station on the reverse link.

The channels used by M2M devices to transmit data to the base station on the reverse link may be random access channels. A device may select a channel and attempt to transmit their data. If the channel is not available, it may result in a collision. The device may select a different channel and use additional energy and power to attempt to transmit its data again. This process causes a delay in the transmission of the data on the reverse link. In addition, valuable power and resources of the M2M devices are wasted as they attempt to identify an available channel through a rudimentary trial and error process.

SUMMARY

The described features generally relate to one or more improved systems, methods, and/or apparatuses for minimizing the power usage of an M2M device communicating in an M2M wireless Wide Area Network (WAN). In one configuration, the operating frequency band used by M2M devices to communicate on a reverse link with a base station may be divided into one or more narrowband frequency channels. During at least a portion of a time slot of each forward link frame transmitted from the base station, channel status information may be transmitted to the M2M devices. The channel status information may indicate a current status for each of the one or more frequency channels. An M2M device may randomly select a channel to use for transmissions on the reverse link that has an idle status. The device may transmit a request to the base station to use the selected channel in a reverse link frame. The channel status information transmitted in the next forward link frame may indicate to the M2M device whether or not the requested channel has been assigned to the M2M device to use for transmissions on the reverse link. When a base station successfully decodes and demodulates data transmitted from an M2M device on an assigned channel, the base station may transition the status information to indicate that the channel is now idle. Upon detecting that the status of the channel has transitioned to idle, the M2M device may terminate the transmission of data, thus conserving power and resources.

A method for managing wireless communications in an M2M wireless WAN are described. An operating frequency band of the M2M wireless WAN is divided into at least a first frequency channel and a second frequency channel. The first and second frequency channels being used for communications on a reverse link. First channel status information and second channel status information are broadcasted to one or more M2M devices. The first channel status information indicating a status of the first frequency channel. The second channel status information indicating a status of the second frequency channel. In one embodiment, the status includes an idle status or a busy status.

In one example, a request is received from an M2M device to use the first frequency channel to transmit data on the reverse link. The first frequency channel may include an idle status. The first frequency channel may be assigned to the M2M device. Assigning the first frequency channel may include transitioning the first channel status information from the idle status to indicate a busy status, and broadcasting the transitioned first channel status information to the one or more M2M devices. In one configuration, data may be received from the M2M device on the first frequency channel. The first frequency channel may include a busy status. Upon decoding the data received from the M2M device, the first channel status information may transition from the busy status to indicate an idle status for the first frequency channel, and the transitioned first channel status information may be broadcasted to the one or more M2M devices.

In one configuration, a request may be received from at least two M2M devices to use the first frequency channel to transmit data on the reverse link. The first frequency channel may include an idle status. One of the at least two M2M devices may be selected, and the first frequency channel may be assigned to the selected one of the M2M devices. Selecting one of the at least two M2M devices may include estimating a strength of the reverse link received from each of the at least two M2M devices, and selecting the one of the at least two M2M devices based in part on at least the estimated strength of the reverse link received from the selected M2M device. In one embodiment, selecting one of the at least two M2M devices may include identifying the M2M device of the at least two M2M devices the most recently transmitted data on the reverse link, and selecting the one of the at least two M2M devices that most recently transmitted data on the reverse link.

In one example, assigning the first frequency channel may include transitioning the first channel status information from the idle status to indicate a busy status, generating an assignment message identifying the selected M2M device, and broadcasting the transitioned first channel status information and the assignment message to the at least two M2M devices.

In one embodiment, a first group of M2M devices may be identified. The first group of M2M devices may receive data on a forward link at a first data rate. A second group of M2M devices may also be identified. The second group of M2M devices may receive data on the forward link at a second data rate. The second data rate may be greater than the first data rate. In addition, a third group of M2M devices may be identified. The third group of M2M devices may receive data on the forward link at a third data rate. The third data rate may be greater than the second data rate.

In one example, channel status information may be broadcasted for a first group of frequency channels to the first group of M2M devices at the first data rate. The channel status information may be transmitted during at least a portion of a first time slot of a first forward link frame. Channel status information may also be broadcasted for a second group of frequency channels to the second group of M2M devices at the second data rate. The channel status information may be transmitted during at least a portion of a first time slot of a second forward link frame. Further, channel status information may be broadcasted for a third group of frequency channels to the third group of M2M devices at the third data rate. The channel status information may be transmitted during at least a portion of a first time slot of a third forward link frame. Frequency division multiple access (FDMA) may be implemented for communications on the reverse link using the first and second frequency channels.

A base station configured for wireless communication on a reverse link in an M2M wireless WAN is also described. The base station may include a processor and memory in electronic communication with the processor. Instructions may be stored in the memory. The instructions may be executable by the processor to divide an operating frequency band of the M2M wireless WAN into at least a first frequency channel and a second frequency channel. The first and second frequency channels may be used for communications on a reverse link. The instructions may also be executable by the processor to broadcast first channel status information and second channel status information to one or more M2M devices. The first channel status information may indicate a status of the first frequency channel. The second channel status information may indicate a status of the second frequency channel.

An apparatus configured for wireless communication on a reverse link in an M2M wireless WAN is also described. The apparatus may include means for dividing an operating frequency band of the M2M wireless WAN into at least a first frequency channel and a second frequency channel. The first and second frequency channels may be used for communications on a reverse link. The apparatus may also include means for broadcasting first channel status information and second channel status information to one or more M2M devices. The first channel status information may indicate a status of the first frequency channel. The second channel status information may indicate a status of the second frequency channel.

A computer program product for managing wireless communication on a reverse link in an M2M wireless WAN is also described. The computer program product may include a non-transitory computer-readable medium storing instructions executable by a processor to divide an operating frequency band of the M2M wireless WAN into at least a first frequency channel and a second frequency channel. The first and second frequency channels may be used for communications on a reverse link. The instructions may also be executable by the processor to broadcast first channel status information and second channel status information to one or more M2M devices. The first channel status information may indicate a status of the first frequency channel. The second channel status information may indicate a status of the second frequency channel.

A method for wireless communication on a reverse link in an M2M wireless WAN is also described. A frequency channel may be identified to use for communications on the reverse link. The frequency channel may include an idle status. A request to use the frequency channel may be transmitted. A first broadcast of a channel status message may be received. The message may indicate a status of the frequency channel. A determination may be made as to whether to use the frequency channel to transmit a data packet based at least in part on the status of the frequency channel.

Determining whether to use the frequency channel may include determining whether the status of the frequency channel has transitioned from the idle status to a busy status. Upon determining the status has transitioned to the busy status, the data packet may be transmitted using the frequency channel. Determining whether to use the frequency channel may also include receiving channel assignment information. The channel assignment information may include an explicit assignment of the frequency channel. The data packet may be transmitted using the frequency channel based at least in part on the channel assignment information.

In one embodiment, a second broadcast of the channel status message may be received. The message may indicate a transition of the status of the frequency channel from the busy status to the idle status. Upon receiving the second broadcast indicating the transition of the status of the frequency channel, transmissions of the data on the reverse link using the frequency channel may be terminated. In one example, transmitting a request to use the frequency channel may include transmitting a preamble of the data packet.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
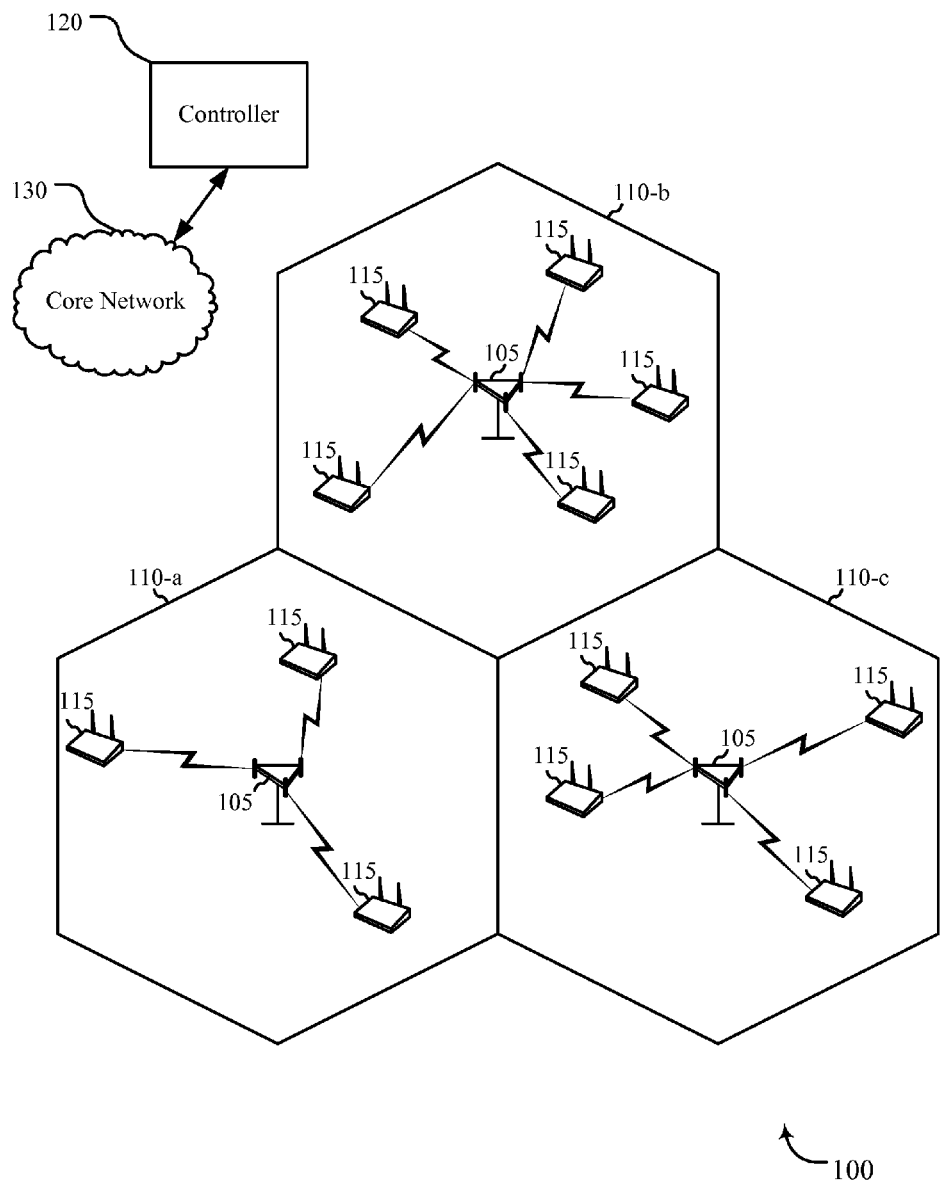
FIG. 1 shows a block diagram of a wireless communications system.

Methods, systems, and devices are described to minimize the usage of power of an M2M device by providing an assignment of a narrowband frequency division multiple access (FDMA) frequency channel for transmissions on the reverse link and early termination of reverse link transmissions. In one embodiment, a base station may transmit a status indicator for each narrowband frequency channel. The status indicator indicates whether a channel is idle or busy. An M2M device may select a channel with an idle status and transmit a request to use the channel. Upon receiving the request, the base station may transition the status indicator to busy. The base station may transmit updated status indicators for each channel. Upon receiving the updated status indicators and discovering that the status for the requested channel has transitioned to busy, the requesting M2M device may become aware that it has been assigned the channel and may begin transmitting on the reverse link using this channel. By providing indicators to inform devices whether they have been assigned a channel, resources and power of M2M devices are conserved by reducing the likelihood of M2M devices randomly selecting a channel that is already in use and attempting to transmit using that channel. If the channel is already in use, this results in M2M devices randomly selecting another channel and trying to transmit again. This process of trial and error to select a channel wastes valuable power and resources of M2M devices.

In the event that more than one M2M device transmits a request to the base station to use the same channel, the base station may select one of the devices to assign to the channel. In addition to transmitting updated status indicators, the base station may also transmit additional information that explicitly identifies the M2M device that has been selected to use the frequency channel.

The present systems, methods, and devices may further minimize the wake-up time of an M2M device by providing early termination of transmissions on the reverse link. In the forward link frame following a reverse link transmission of data, the M2M device may determine whether the status indicator of the channel used to transmit on the reverse link has transitioned to an idle status. If the status has transitioned, the M2M device may treat this transition as an acknowledgment (ACK) message from the base station that the data packet transmitted on the reverse link has been successfully decoded and demodulated by the base station. The M2M device may then terminate further transmissions of the data packet and conserve power and resources.

The following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a block diagram illustrates an example of a wireless communications system 100. The system 100 includes base stations 105 (or cells), machine-to-machine (M2M) devices 115, a base station controller 120, and a core network 130 (the controller 120 may be integrated into the core network 130). The system 100 may support operation on multiple carriers (waveform signals of different frequencies).

The base stations 105 may wirelessly communicate with the M2M devices 115 via a base station antenna (not shown). The base stations 105 may communicate with the M2M devices 115 under the control of the base station controller 120 via multiple carriers. Each of the base station 105 sites may provide communication coverage for a respective geographic area. The coverage area for each base station 105 here is identified as 110-a, 110-b, or 110-c. The coverage area for a base station may be divided into sectors (not shown, but making up only a portion of the coverage area). The system 100 may include base stations 105 of different types (e.g., macro, pico, and/or femto base stations). A macro base station may provide communication coverage for a relatively large geographic area (e.g., 35 km in radius). A pico base station may provide coverage for a relatively small geographic area (e.g., 10 km in radius), and a femto base station may provide communication coverage for a relatively smaller geographic area (e.g., 1 km in radium). There may be overlapping coverage areas for different technologies.

The M2M devices 115 may be dispersed throughout the coverage areas 110. Each M2M device 115 may be stationary or mobile. In one configuration, the M2M devices 115 may be able to communicate with different types of base stations such as, but not limited to, macro base stations, pico base stations, and femto base stations. The M2M devices 115 may be sensors and/or meters that monitor and/or track other devices, environmental conditions, etc. The information collected by the M2M devices 115 may be transmitted across a network that includes a base station 105 to a back-end system, such as a server. The transmission of data to/from the M2M devices 115 may be routed through the base stations 105. The base stations 105 may communicate with the M2M devices on a forward link. In one configuration, the base stations 105 may generate a forward link frame with a number of time slots that include channels to carry data and/or messages to an M2M device 115. In one example, each forward link frame may include no more than three time slots and one or more corresponding channels. These slots and channels may include a paging slot with a paging channel, an uplink control slot with an uplink control channel (UCC), and a traffic slot with a traffic channel. The uplink control slot may also be used as an ACK slot during which ACK messages may be transmitted using an ACK channel. The length of an individual forward link frame may be short (e.g., 20 milliseconds (ms)). In one embodiment, four frames may be joined to form a larger frame with a duration of 80 ms. Each frame included in the larger frame may include no more than three time slots and channels such as the paging slot for the paging channel, the uplink control slot for the UCC, and the traffic slot for the traffic channel. The paging and uplink control slots of each frame may each have a length of 5 ms while the traffic slot of each frame may have a length of 10 ms. An M2M device 115 may wake up during the individual frames (within the larger frame) that include data and/or messages on its channels that are intended for that M2M device 115.

In one configuration, a base station 105 may transmit data to an M2M device 115 according to a traffic channel cycle. The traffic channel cycle may be a time period during which traffic data is transmitted to one or more M2M devices 115 during one or more traffic slots of forward link frames. Each M2M device 115 may be aware of when its traffic channel cycle begins. During the uplink control slot of each forward link frame of the cycle, the base station 105 may transmit information indicating a status of each narrowband frequency available to the M2M devices 115 to use to transmit on the reverse link. The M2M devices 115 may use this status information to select a narrowband channel to use to transmit data packets back to the base station. The base station 105 may receive requests from the devices 115 for the various channels. The base station 105 may respond to the devices 115 to indicate whether or not they are assigned to their selected channel by transitioning the status indicator of a channel. The base station 105 may also explicitly identify which M2M device 115 has been assigned to use a specific channel if more than one M2M device 115 requests the use of the same narrowband frequency channel.

In one embodiment, M2M devices 115 may be incorporated in other devices or the M2M devices 115 may be standalone devices. For example, devices such as cellular phones and wireless communications devices, personal digital assistants (PDAs), other handheld devices, netbooks, notebook computers, surveillance cameras, handled medical scanning devices, home appliances, etc. may include one or more M2M devices 115.

In one example, the network controller 120 may be coupled to a set of base stations and provide coordination and control for these base stations 105. The controller 120 may communicate with the base stations 105 via a backhaul (e.g., core network 125). The base stations 105 may also communicate with one another directly or indirectly and/or via wireless or wireline backhaul.

Figure 2:
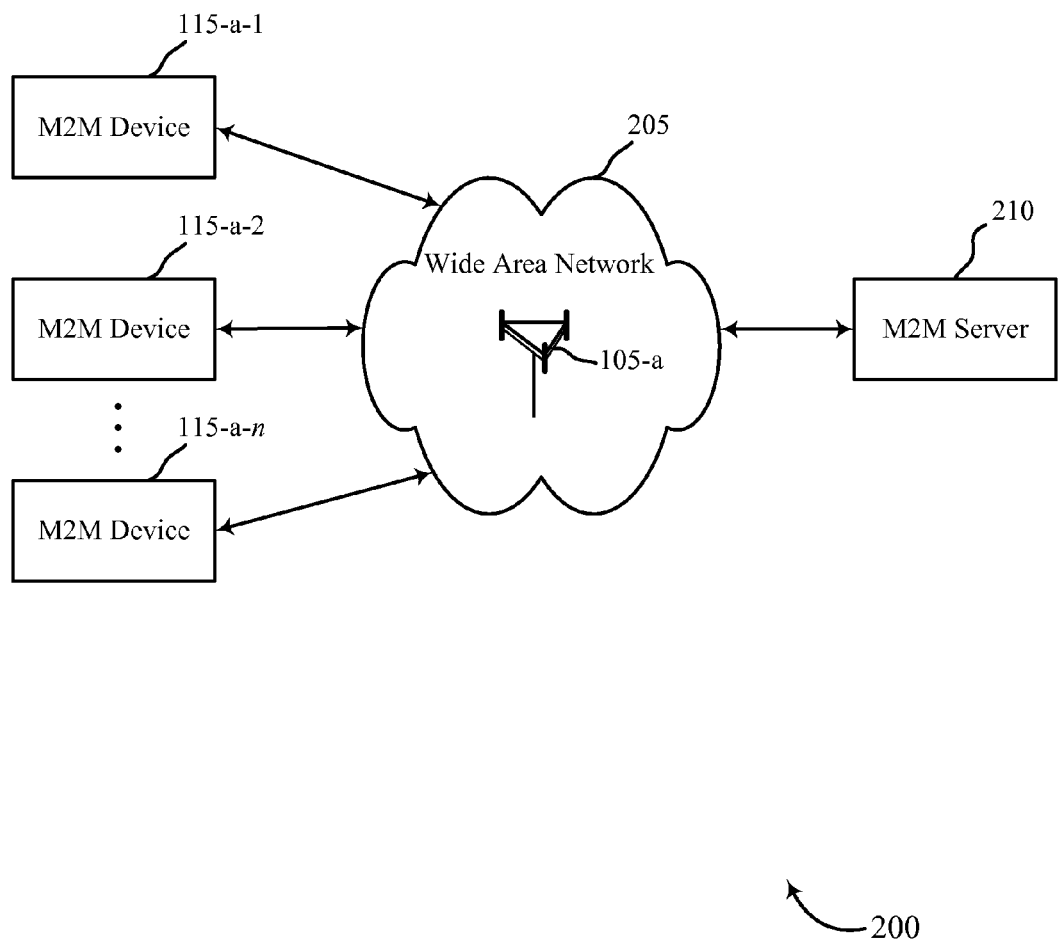
FIG. 2 illustrates an example of a wireless communication system including a wireless wide area network (WAN) implementing M2M communications.

FIG. 2 illustrates an example of a wireless communication system 200 including a wireless wide area network (WAN) 205 implementing an M2M service according to one aspect. The system 200 may include a number of M2M devices 115-*a* and an M2M server 210. Communications between the server 210 and M2M devices 115 may be routed through a base station 105, which may be considered part of the WAN 205. The base station 105-*a* may be an example of the base stations illustrated in FIG. 1. The M2M devices 115-*a* may be examples of the M2M devices 115 illustrated in FIG. 1. One skilled in the art would understand that the quantity of M2M devices 115-*a*, WANs 205, and M2M servers 210 shown in FIG. 2 is for illustration purposes only and should not be construed as limiting.

The wireless communication system 200 may be operable to facilitate M2M communications. M2M communications may include communications between one or more devices without human intervention. In one example, M2M communications may include the automated exchange of data between a remote machine, such as an M2M device 115-*a*, and a back-end IT infrastructure, such as the M2M server 210, without user intervention. The transfer of data from an M2M device 115-*a* to the M2M server 210 via the WAN 205 (e.g., the base station 105-*a*) may be performed using reverse link communications. Data collected by the M2M devices 115-*a* (e.g., monitoring data, sensor data, meter data, etc.) may be transferred to the M2M server 210 on the reverse link communications.

The transfer of data from the M2M server 210 to an M2M device 115-*a* via the base station 105-*a* may be performed via forward link communications. The forward link may be used to send instructions, software updates, traffic data, and/or messages to the M2M devices 115-*a*. The instructions may instruct the M2M devices 115-*a* to remotely monitor equipment, environmental conditions, etc. M2M communications may be used with various applications such as, but not limited to, remote monitoring, measurement and condition recording, fleet management and asset tracking, in-field data collection, distribution, and storage, etc. The base station 105-*a* may generate one or more forward link frames with a small number of time slots with channels to transmit instructions, software updates, and/or messages. The various M2M devices 115-*a* may wake up during the time slots of a specific frame when instructions or other data is included on a channel during the time slots of that frame. The devices 115-*a* may become aware that instructions or other data are available by decoding a paging message during a paging slot of a frame. A paging cycle may indicate how often the base station 105-*a* should transmit a paging message to an M2M device 115-*a*. The device 115-*a* may wake up during a paging slot to monitor for a paging message according to the paging cycle. The paging messages may be transmitted at different data rates, depending on the signal strength of the M2M device 115-*a*.

In one configuration, different types of M2M communications may be proposed in different wireless access networks that use different addressing formats. Different addressing formats may lead to different types of M2M devices 115-*a* being used for different services. In one aspect, an M2M network may be implemented which may maintain the M2M devices 115-*a* independent of the WAN technology that is used to communicate with the M2M server 210. In such an aspect, the M2M devices 115-*a* and the M2M server 210 may be made independent of the WAN technology that is used. As a result, a WAN technology used for backhaul communication may be replaced with a different WAN technology, without affecting the M2M devices 115-*a* that may already be installed. For example, the M2M server 210 and an M2M device 115-*a* may communicate with each other irrespective of the addressing format used by the WAN technology since the addressing format used by the M2M device 115-*a* may not be tied with the addressing used by the implemented WAN technology.

In one embodiment, the behavior of the M2M devices 115-*a* may be pre-defined. For example, the day, time, etc. to monitor another device and transmit the collected information may be pre-defined for an M2M device 115-*a*. For example, the M2M device 115-*a*-1 may be programmed to begin monitoring another device and collect information about that other device at a first pre-defined time period. The device 115-*a*-1 may also be programmed to transmit the collected information at a second pre-defined time period. The behavior of an M2M device 115-*a* may be remotely programmed to the device 115-*a*.

Figure 3A:
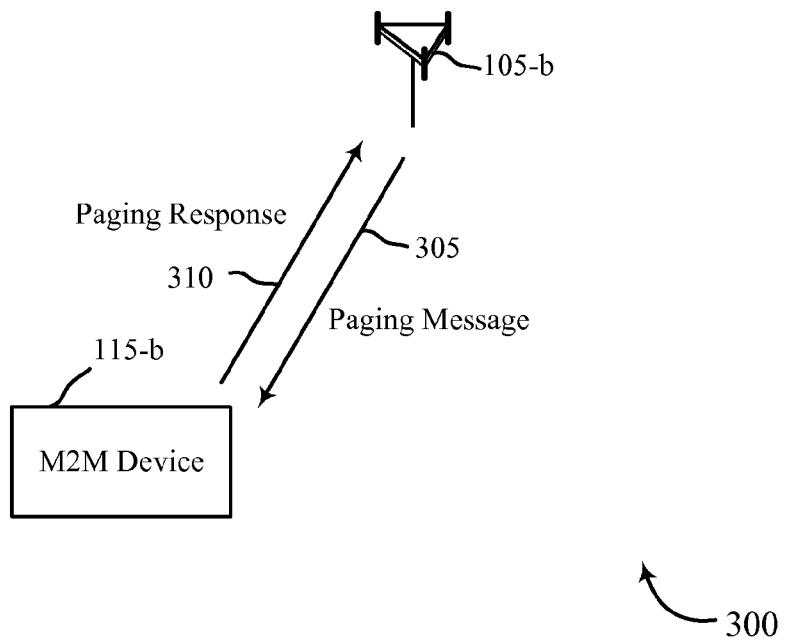
FIG. 3A shows a block diagram illustrating one embodiment of a paging system.

FIG. 3A is a block diagram illustrating one embodiment of a paging system 300 including a base station 105-*b* and an M2M device 115-*b*. The base station 105-*b* may be an example of the base stations 105 of FIG. 1 or 2. The M2M device 115-*b* may be an example of the M2M devices 115 of FIG. 1 or 2.

In a wireless communication system, such as the systems of FIG. 1 or 2, the notions of sleep state and paging are important to provide network connectivity to a large population of devices (e.g., M2M devices 115) in a battery power and air link resource efficient manner. A sleep state may provide the M2M device 115-*b* with a mode of operation to minimize battery power consumption by shutting down the whole or a part of the devices' transmit/receive circuitry. In addition, an M2M device 115 in the sleep state may not be allocated any dedicated air link resource and therefore a large number of M2M devices may be simultaneously supported. During time intervals where the M2M device 115-*b* has no traffic activity, the device 115-*b* may remain in the sleep state to conserve resources.

Paging may involve the M2M device 115-*b* waking up periodically from the sleep state, and having the M2M device 115-*b* operate to receive and process a paging message 305 in the forward link communications (e.g., communications from the base station 105-*b* to the M2M device 115-*b*). The base station 105-*b* may be aware when the M2M device 115-*b* should wake up. Thus, if the base station 105-*b* intends to contact, or page, the M2M device 115-*b*, the base station 105-*b* may send the paging message 305 in a paging channel during all or a portion of one or more paging slots of a forward link frame at the time when the M2M device 115-*b* is scheduled to wake up and monitor the paging channel. The base station 105-*b*, however, may not be aware of the signal strength of each M2M device 115 in the M2M wireless WAN. As a result, the base station 105-*b* may transmit paging messages at a high data rate using a first paging channel. If the M2M device 115-*b* is unable to properly demodulate the paging message 305 because the signal strength between the base station 105-*b* and the device 115-*b* is too low, the base station 105-*b* may dynamically change the data rate used to transmit the message to the device 115-*b*. In addition, the base station 105 may increase the frequency it transmits the paging message 305 and the device 115-*b* may increase the frequency it wakes up to monitor for the paging message 305 sent at the lower data rate. In one configuration, if the base station 105-*b* does not receive a paging response 310 confirming that the M2M device 115-*b* has received the paging message, the base station 105-*b* may retransmit the paging message 305 using a second paging channel during the paging slot more frequently and at a lower data rate. The base station 105-*b* may retransmit the paging message 305 until either the M2M device 115-*b* receives the paging message 305 and transmits a paging response 310 and/or a certain number of transmissions of the paging message 305 have occurred. If one or both of these events occur, the base station 105-*b* and the M2M device 115-*b* may return to operate under the previous paging cycle and the base station 105-*b* may return to transmit paging messages to the device 115-*b* at a high data rate using the first paging channel.

The time interval between two successive wake-up periods of an M2M device 115-*b* may be referred to as a paging cycle. The M2M device 115-*b* may operate in a sleep state during the portion of the paging cycle when the M2M device 115-*b* is not performing processing related to receiving a paging message 305. In order to maximize the benefit of the sleep state, the paging system 300 may use a large value for the paging cycle. For example, in a data system, the paging cycle may be about 5 minutes. As mentioned above, if the base station 105-*b* does not receive the paging response 310 indicating the successful receipt of the paging message 305, the base station 105-*b* may retransmit the paging message 305 using a smaller paging cycle until the paging response 310 is received. The retransmission of the paging message 305 may occur using the same channel or a different channel. Further, the M2M device 115-*b* may wake up more periodically (i.e., shorter paging cycle) to monitor paging slots of frames for the paging message 305.

In one embodiment, the paging channel used during the paging slot of a frame may have sufficient bandwidth to carry a number of paging messages 305. In one example, the paging channel may carry less than the maximum amount of paging messages 305. The base station 105-*b* may insert system information into the extra, unused bandwidth of the paging channel during the paging slot. The system information may be used by a number of M2M devices 115 to acquire the timing of the signals transmitted from the base station 105-*b*. Reusing the paging channel to transmit system information avoids the need to set up additional channels during additional time slots of the forward link frames to carry such information (which may increase the overall length of a forward link frame). As a result, M2M devices 115 may conserve power by minimizing the amount of time they are in an awake mode. By reusing the paging channel, the time slots of the frames transmitted on the forward link may be kept short, allowing the M2M devices 115 to return to the sleep mode as quickly as possible.

Upon receiving the paging message 305, the M2M device 115-*b* may carry out any operations specified in the paging message 305. For example, the M2M device 115-*b* may just receive the paging message 305 and go back to the sleep state. Alternatively, the M2M device 115-*b* may access the base station 105-*b* to establish an active connection with the base station 105-*b*.

Figure 3B:
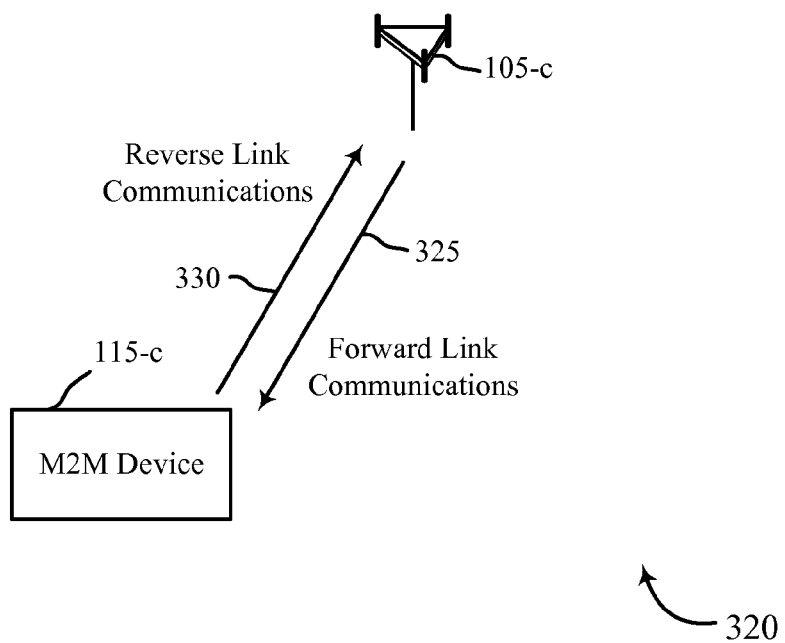
FIG. 3B is a block diagram illustrating one embodiment of a wireless communications system.

FIG. 3B is a block diagram illustrating one embodiment of a wireless communications system 320. The system 320 may include a base station 105-*c* and an M2M device 115-*c*. The base station 105-*c* and the M2M device 115-*c* may be examples of the base stations and M2M devices of FIG. 1, 2, or 3A. In one configuration, the base station 105-*c* may communicate with the M2M device 115-*c* using a forward link frame with a limited number of time slots for logical channels used for forward link communications 325. The M2M device 115-*c* may communicate with the base station 105-*c* using reverse link communications 330. Communications that occur using the forward and reverse link communications may be M2M communications, as described above. These communications may take various forms, depending principally on the air interface protocol used by the base station 105-*c* and the M2M device 115-*c*.

The base station 105-*c* may be arranged to communicate on one or more carrier frequencies, typically using a pair of frequency bands to define the forward and reverse links communications, respectively. The base station 105-*c* may also include a set of directional antenna elements arranged to define multiple cell sectors. M2M communications in each sector on a given carrier frequency may be distinguished from communications in other sectors by modulating the communications in the given sector with a sector-specific code, such as a pseudo-random noise offset ("PN offset"). Further, M2M communications in each sector may be divided into control and traffic channels, each of which may be defined through time division multiplexing (TDM).

In one embodiment, signals may be transmitted on the forward link communications 325 and the reverse link communications 330 in a frame format. Within the frame format, information may be packetized and formatted according to the actual payload data to be communicated over the communication links 325, 330. In one configuration, the format of a frame transmitted on the forward link communications 325 may include various time slots for various channels. In one embodiment, the frame may include a paging slot for the paging channel, an uplink control slot for the UCC, and a traffic slot for the traffic channel. As mentioned above, paging messages 305 and/or system information may be transmitted in the paging channel (according to the paging cycle) to the M2M device 115-c during a paging slot. Uplink control messages may be transmitted in the UCC to an M2M device during the Uplink control time slot. These messages may indicate a current status of each narrowband frequency channel that may be used for communications on the reverse link. Traffic data may be transmitted in the traffic channel to the M2M device 115-c during the traffic time slot. Frames used on the forward link communications 325 in M2M communications may be based on a short duty cycle.

To conserver power, an M2M device 115 may wake up only during specific time slots of specific forward link frames to receive data, paging messages 305, etc. As a result, the frame structure in M2M communications may be slotted for each M2M device. Thus, each device 115 may only be required to wake up during one or more slots of one or more frames that are needed to retrieve its data. At the commencement of a traffic channel cycle, a slot map may be broadcasted to each M2M device 115 that is expecting to receive traffic data during the cycle. The slot map may include information that allows each M2M device to estimate when their respective traffic data will be transmitted on the forward link during the cycle. The information within the slot map may be hashed to enable each device 115 to identify when its data will be transmitted. After receiving the slot map, the devices 115 may return to a sleep state and awake again during the one or more traffic slots in which their data is transmitted.

In one configuration, to preserve communication resources, the M2M device 115-c may perform opportunistic decoding of a message transmitted from the base station 105-c in order to return to the sleep state, according to the present systems and methods. In one embodiment, the base station 105-c may generate one or more forward link frames and transmit multiple copies of a message to the M2M device 115-c using a channel of the one or more forward link frames. Each copy of the message may be sent in a sub-channel at a high data rate. The M2M device 115-c may read as many copies of the message as are needed to successfully demodulate the message. In one configuration, the M2M device 115-c may estimate the number of copies of the message it needs to receive to decode the message based on the received signal strength from a pilot signal transmitted from the base station 105-c. Upon successfully decoding the message, the device 115-c may return to a sleep state before generating and transmitting an physical layer acknowledgment (ACK) message back to the base station 105-c. If additional copies of the message remain in the sub-channels, the base station 105-c may continue to transmit the additional copies (even though the M2M device 115-c has returned to the sleep state). In one configuration, the device 115-c may conserve battery power by not transmitting the physical layer ACK message to the base station indicating that the message has been demodulated.

In one example, to further increase the power efficiency of the M2M device 115-c, a narrowband FDMA technique may be used for the reverse link communications 330. This technique may include dividing the operating band of the reverse link communications 330 into a number of narrowband frequency channels. The base station 105-c may broadcast the status and assignment of each narrowband channel to each M2M device 115. The status may be "busy" or "idle". In one embodiment, the M2M device 115-c may only transmit data if a narrowband frequency channel is assigned to the device 115-c. The early termination of the reverse link communications 330 (described above) may be incorporated into the narrowband FDMA technique to exploit the signal-to-interference noise ratio (SINR) distribution and to support multiple data rates in the reverse link communications 330. Early termination on the reverse link may occur when the status of a frequency channel transitions from a busy status to an idle status. Upon detecting that the status has transitioned to idle, the M2M device may terminate transmissions on the reverse link.

In one embodiment, as previously stated, the reverse link communications 330 may be terminated early to conserve the battery power of the M2M device 115-c and air interface resources between the M2M device 115-c and the base station 105-c. In addition to terminating reverse link transmissions early through a change in the status of a channel, the forward link frame may include a time slot during which an acknowledgment (ACK) message may be transmitted. The channel used to transmit the ACK message during the slot may be a common or shared channel. The base station 105-c may use the channel to carry ACK messages that acknowledge the reception of a reverse link physical layer packet sent from the M2M device 115-c using the reverse link communications 330. In one configuration, a greater number of ACK messages may be transmitted in an ACK packet when the conditions of the forward link frame appear to be favorable. This may include identifying a number of copies of a packet an M2M device must transmit on the reverse link communication 330 until it is successfully decoded by the base station. Similarly, a smaller number of ACK messages may be transmitted in an ACK packet when the conditions of the forward link do not appear to be as favorable. Increasing and decreasing the number of ACK messages in a packet effectively changes the data rate that is used to transmit an ACK message to an M2M device. As a result, rather than sending every ACK message at the lowest data rate, some ACK messages may be sent at a higher data rate. When ACKs (i.e., ACK messages) are transmitted at higher data rates to the M2M device 115-c, the device 115-c may receive and decode the ACK more quickly, thus increasing the forward link ACK throughput and terminating the reverse link communications 330 at an earlier time period than if the ACK was transmitted using a low data rate.

In one configuration, to conserve power of the M2M devices, the operating band of the reverse link communications 330 may be divided into multiple reverse link frequency channels where CDMA techniques may be used to multiplex the reverse link communications for multiple M2M devices 115. In one example, each reverse link frequency channel may have its own rise over thermal (RoT) operation point. At least one frequency channel may be dedicated as a low data rate random access channel, with a low RoT. Dividing the operating band of the reverse link communications 330 may provide a low RoT operation target (e.g., 1 decibel (dB) or less) for reverse link communications for M2M devices that do not have a strong signal strength with the base station. A low RoT may reduce the link budget requirement for those devices in locations with large path loss.

Figure 4A:
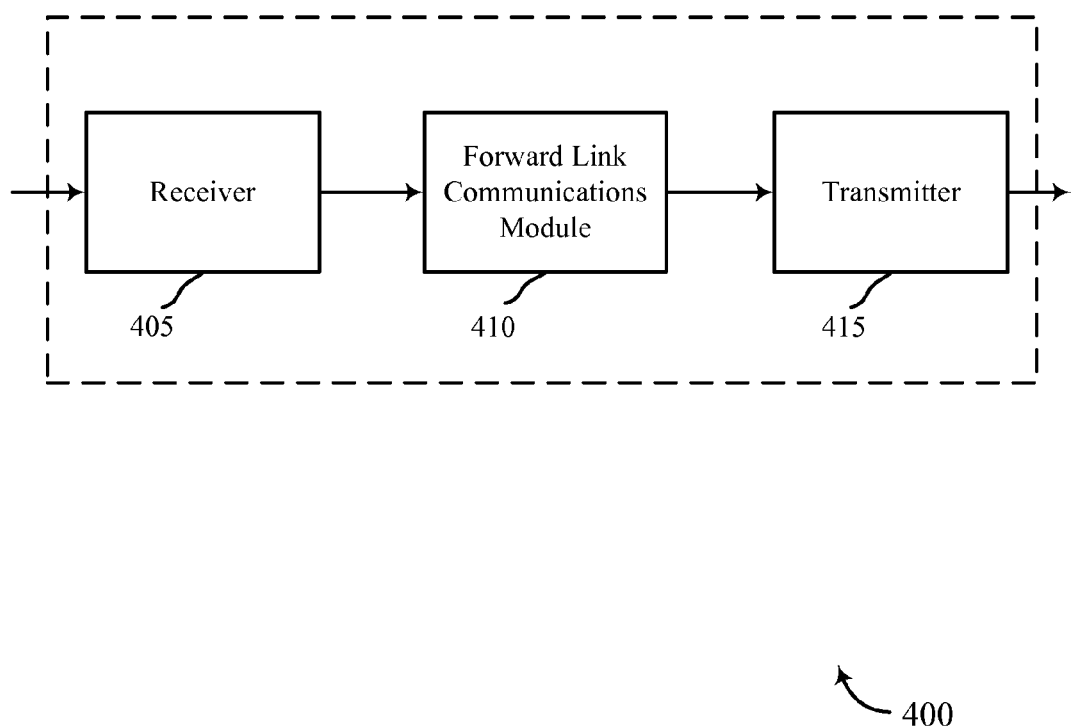
FIG. 4A is a block diagram illustrating a device for managing forward link communications in accordance with various embodiments.

Turning next to FIG. 4A, a block diagram illustrates a device 400 for managing forward link communications in accordance with various embodiments. The device 400 may be an example of one or more aspects of base stations 105 described with reference to FIGS. 1, 2, 3A, and/or 3B. The device 400 may also be a processor. The device 400 may include a receiver module 405, a forward link communications module 410, and/or a transmitter module 415. Each of these components may be in communication with each other.

These components of the device 400 may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The receiver module 405 may receive information such as a packet, data, and/or signaling information regarding what the device 400 has received or transmitted. The received information may be utilized by the forward link communications module 410 for a variety of purposes.

The receiver module 405 may be configured to receive a reverse link physical layer packet sent from an M2M device 115 using reverse link communications 330. The receiver module 405 may also be configured to receive instructions, a set of operations, messages, etc. from a back-end server to communicate to an M2M device 115. The forward link communications module 410 may generate one or more forward link frames. The frames may be short duty cycle frames that include a minimal number of time slots used for logical channels. The forward link frames may be slotted for communications with multiple M2M devices. Details regarding the forward link frame will be described below.

The forward link communications module 410 may monitor and update the status of each narrowband frequency channel available to M2M devices for communications on the reverse link. When a channel is not in use, the status may be set to idle. When the channel is used to carry reverse link transmissions, the status may be set to busy. The module 410 may transmit the current status of each channel in each forward link frame transmitted from the base station. The module 410 may also assign an M2M device to a specific channel if more than one request for that particular channel is received. By implicitly assigning (e.g., transitioning the status to busy) or explicitly assigning (e.g., transmitting assignment information) channels to M2M devices, reverse link communications may be more efficient and power of the devices may be conserved.

In one embodiment, the forward link communications module 410 may generate a number of paging messages 305 to transmit to a number of M2M devices 115 via the transmitter module 415. The paging messages 305 may alert specific M2M devices 115 that a base station 105 is requesting the M2M device 115 to make contact with the base station 105. In one configuration, paging messages 305 may be transmitted in the paging channel (or a sub-channel of the paging channel) during the paging time slot at different data rates, depending on whether the M2M device 115 successfully demodulates a paging message.

In one configuration, the paging channel may include less than the maximum number of paging messages 305. If the paging channel does not include the maximum number of paging messages 305, the paging slot may be determined to idle. The unused capacity of the paging channel may be utilized by inserting system information into the paging channel. The system information may then be broadcast to the M2M devices 115 in the paging channel during the paging time slot of the forward link frame. Additional channels and time slots are avoided in forward link frames to transmit this type of information. Instead, idle paging time slots may be reused to transmit system information.

The receiver module 405 may receive a paging response 310 when the M2M device 115 successfully decodes the paging message 305. When the receiver module 405 does not receive the paging response 310, the forward link communications module 410 may be configured to instruct the transmitter module 415 to retransmit the paging message 305. The transmitter module 415 may retransmit the message 305 at a lower data rate and at a higher frequency than the original transmission of the paging message 305. The transmitter module 415 may cease the retransmission when a paging response 310 is received by the receiver module 405 and/or after a certain number of retransmissions of the message 305 have been transmitted. The transmitter module 415 may transmit and retransmit the paging messages 305 on different sub-paging channels of different forward link frames. In one configuration, when the paging channel is not needed to transmit a paging message 305, the forward link communications module 410 may generate and insert system information into the paging channel of the forward link frame. The transmitter module 415 may transmit the system information to an M2M device 115 in the paging channel of the frame. In one configuration, the transmitter 415 may transmit information using multiple paging channels of multiple frames. Paging messages may be transmitted in different paging channels at different data rates and at different paging cycles.

Figure 4B:
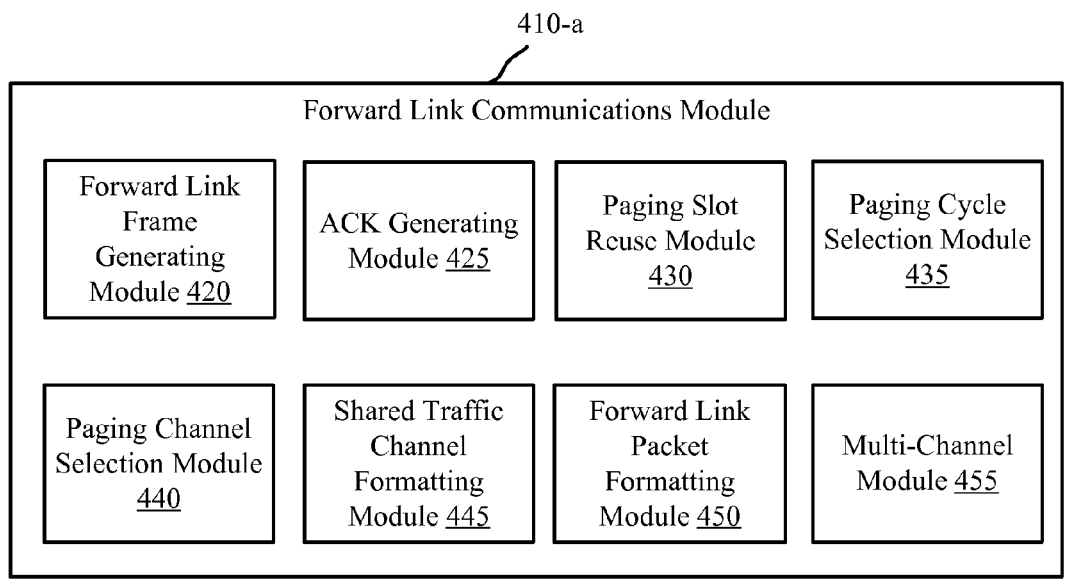
FIG. 4B is a block diagram illustrating one embodiment of a forward link communications module.

FIG. 4B is a block diagram illustrating one embodiment of a forward link communications module 410-a. The module 410-a may be an example of the forward link communications module of FIG. 4A. In one example, the module 410-a may include a forward link frame generating module 420, an ACK generating module 425, a paging slot reuse module 430, a paging cycle selection module 435, a paging channel selection module 440, a shared traffic channel formatting module 445, a forward link packet formatting module 450, and a multi-channel module 455.

The forward link frame generating module 420 may generate a physical layer frame to be used for communications on the forward link 325 (e.g., from a base station to an M2M device). The generated frame may be based on a short duty cycle and a small number of slotted physical layer channels. For example, the module 420 may generate a forward link physical layer frame that is a total of 20 milliseconds (ms). The slotted operation of the frame generated by the module 420 may allow the M2M device 115 to wake up and turn on its radio only during the scheduled time slot of the frame where it is expecting data. As a result, the M2M device 115 may be in the awake mode for less than the length of the frame.

Each of the physical channels of the forward link frame may include both pilot symbols and data symbols, which may be time division multiplexed (TDM). In one configuration, a forward link frame generated by the module 420 may include a paging slot, an uplink control slot, and a traffic slot. Paging messages and other information may be transmitted in a paging channel to an M2M device 115 on the forward link communications 325 during the paging time slot. Channel status information and channel assignment information may be transmitting during the uplink control slot. Data traffic may be transmitted in a traffic channel to an M2M device 115 during the traffic slot.

The ACK generating module 425 may generate an ACK message to transmit on the forward link communications 325. The message may be transmitted in an ACK channel that is part of the forward link frame generated by the forward link frame generating module 420. In one configuration, the channel may be used to transmit multiple ACKs in an ACK packet. Each ACK in the packet may be an identifier (ID) of an M2M device 115. The ID may be a network ID of an M2M device. In addition, the ID may be a compressed version of the network ID. For example, a compressed ID may be a hash of the network ID of the M2M device 115. In one configuration, the ACK generating module 425 may group multiple ACKs to create the ACK packet. In one embodiment, ACK packets may include different quantities of ACKs depending on the channel conditions of the forward link.

In some instances, a paging slot may be idle for a certain forward link frame. For example, the capacity of the paging channel during the paging slot may not be at full capacity. For instance, the paging slot may not be scheduled to transmit a paging message 305 for an M2M device 115. As a result, the paging channel may be empty (e.g., no paging messages 305). The paging slot reuse module 430 may reuse the idle paging slot to communicate system information to the M2M device 115. The system information may include system timing and sector number information and may be inserted into the paging channel for transmission to the M2M devices 115 during the paging time slot. Thus, the establishment of additional channels within the forward link frame to convey the system information to an M2M device 115 may be avoided. Instead, the paging slot reuse module 430 may insert the system information in an idle paging channel of the paging slot in the frame.

In one embodiment, the paging cycle selection module 435 may select a particular paging cycle to transmit paging messages to an M2M device. The module 435 may provide a flexible paging scheme to dynamically change the paging cycle for an M2M device 115 in an M2M wireless WAN. The paging cycle selection module 435 may dynamically change the paging cycle depending on whether a paging response 310 is received from the device 115, the time of day, the state of operation of the M2M device 115, etc.

In one configuration, the paging channel selection module 440 may select between sub-channels of the paging channel to transmit a paging message to an M2M device 115 using the forward link communications 325. For example, the selection module 440 may select between a primary and secondary paging channel. The module 440 may provide a paging scheme that allows for paging messages to be transmitted at different data rates in an M2M WAN using primary and secondary paging channels. The primary paging channel may be used for longer paging cycles while the secondary paging channel may be used for shorter paging cycles. In one example, a base station 105 may transmit a first paging message. The module 440 may select the primary channel. The first paging message may be transmitted in the primary channel at a high data rate over a long paging cycle. The base station may also transmit a second paging message. The module 440 may select the secondary paging channel. The second paging message may be transmitted in the second paging message since the second message is to be transmitted at a lower data rate over a shorter paging cycle. In one embodiment, the first and second paging messages may be the same. In one example, the paging channels may be logical channels. In one configuration, the paging channels may be code division multiple access (CDMA) channels. In one example, the paging channels may be time division multiple access (TDMA) channels.

The shared traffic channel formatting module 445 may format a traffic channel in the forward link frame that may be shared by multiple M2M devices. When a M2M device 115 is expecting data on a shared traffic channel during a traffic slot within a given traffic channel cycle, the device 115 may continue reading the traffic channel slots across multiple forward link frames during a traffic channel cycle until it finds its data as indicated by the ID field. As a result, the M2M device 115 may stay awake longer than necessary to find its data. The formatting module 445 may format the traffic channel in such a way so as to minimize the wake up time for the M2M device 115. The M2M device 115 may determine which slot(s) of a particular frame(s) to wake up in order to retrieve its data on the shared traffic channel. To determine which slot to wake up for, the base station 105 may broadcast a slot map during the first traffic slot of the cycle. The map may use hashing functions to identify which traffic slot an M2M device 115 can expect to receive its data during the cycle. The traffic channel may be formatted by the module 445 to allow the device to determine which slot to use. For example, the module 445 may format the shared traffic channel so that the hashed slot either contains the data or a pointer to a slot where the actual data is located. If a slot of a first frame cannot contain all the pointers, the module 445 may set an overflow flag and provide a pointer to another slot of another frame where the hashed M2M device can check for its data. If all the data for the M2M device 115 cannot be accommodated during a single slot, then the module 445 may format a trailer field of the channel to include a pointer to another slot where the remaining data is transmitted.

The forward link packet formatting module 450 may format a packet to be transmitted on the forward link communications 325. In one example, the module 450 may create multiple copies of the packet. In addition, the module 450 may insert a single copy of the packet into a sub-slot of a time slot in a forward link frame. In one embodiment, a time slot (e.g., paging slot, uplink control slot, traffic slot) of a forward link frame may be divided in a number of sub-slots. The forward link packet formatting module 450 may insert a single copy of the packet into each of the generated sub-slots. In one configuration, the channel used to carry the packet during the time slot may also be divided into a number of sub-channels. As a result, a sub-channel may be used during each sub-slot to carry the copy of the packet on the forward link communications 325. Each sub-channel may be used to transmit the copies of the packet at a high data rate.

In one embodiment the multi-channel module 455 may divide an operating frequency band of the reverse link into a number narrowband FDMA frequency channels. The module 455 may broadcast the status of each channel to one or more M2M devices. Upon receiving a request from an M2M device to use a channel for reverse link communications, the multi-channel module 455 may transition the status of the channel to a busy status. In one configuration, transitioning the status may include changing a one-bit indicator from a "0" to a "1" to represent a busy status. The updated status may be transmitted to the one or more M2M devices. When a base station 105 has successfully decoded or demodulated a data packet sent on the reverse link, the module 455 may transition the status of the reverse link channel from a busy status to an idle status.

If the module 455 detects more than one request for the same narrowband frequency channel, the module 455 may select a particular M2M device to be assigned to the channel and transition the status of the channel. In addition to transmitting the updated status information to the one or more M2M devices, the module 455 may generate assignment information that identifies the M2M device selected to use the narrowband channel.

The multi-channel module 455 may also divide the operating frequency band of the reverse link into a number of CDMA frequency channels. The module 455 may also set an RoT threshold for each frequency channel. In one embodiment, the multi-channel module 455 may determine which M2M devices 115 in the M2M wireless WAN should use certain channels to communication on the reverse link. The module 455 may transmit these channel assignments to the M2M devices 115. In addition, the multi-channel module 455 may dynamically alter the RoT thresholds of one or more frequency channels. The decision to change an RoT threshold may depend on network congestion, traffic on a one or more individual channels, time of day, and the like. Details regarding dynamically altering RoT threshold of frequency channels will be described in more detail below.

Figure 5A:
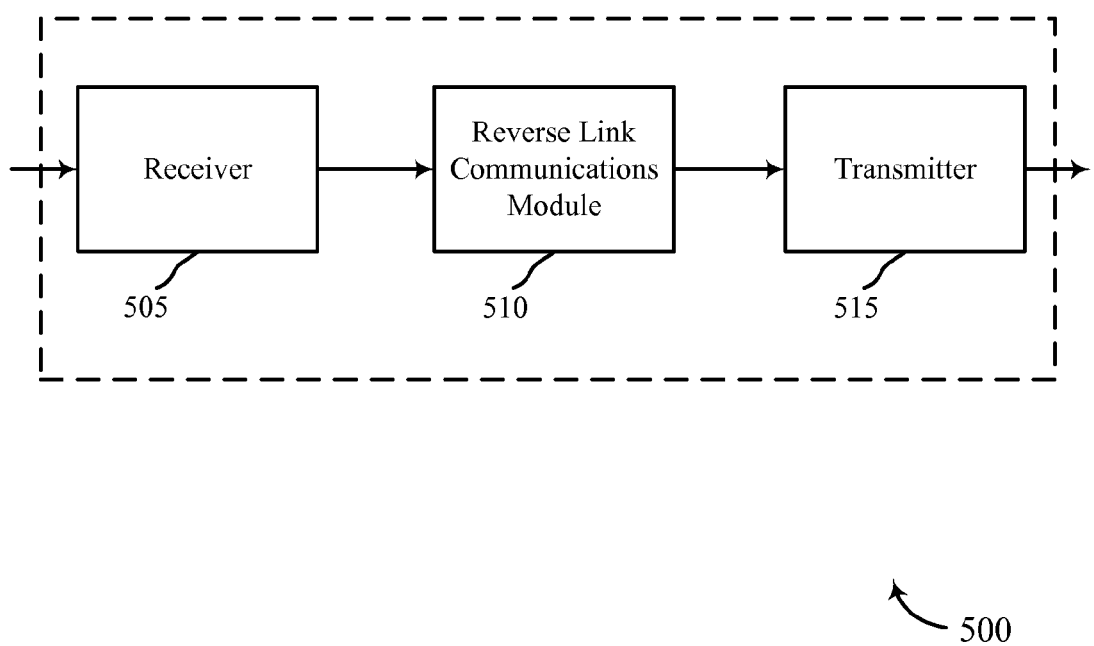
FIG. 5A is a block diagram illustrating a device for managing reverse link communications in accordance with various embodiments.

FIG. 5A is a block diagram illustrating a device 500 for managing reverse link communications in accordance with various embodiments. The device 500 may be an example of one or more aspects of the M2M device 115 and/or the base station 105 described with reference to FIGS. 1, 2, 3A, and/or 3B. The device 500 may also be a processor. The device 500 may include a receiver module 505, a reverse link communications module 510, and/or a transmitter module 515. Each of these components may be in communication with each other.

These components of the device 500 may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The receiver module 505 may receive information such as a packet, data, and/or signaling information regarding what the device 500 has received or transmitted. The received information may be utilized by the reverse link communications module 510 for a variety of purposes.

The receiver module 505 may be configured to receive a forward link physical layer packet sent from a base station 105 using forward link communications 325. The reverse link communications module 510 may generate a reverse link frame that includes a traffic slot during which traffic may be transmitted from an M2M device 115 to a base station 105.

In one embodiment, the reverse link communications module 510 may cause communications on the reverse link to terminate early. As previously explained, the transition of the status from busy to idle of a narrowband frequency channel used for reverse link communications may trigger early termination on the reverse link. Upon detecting the change in the channel status, the reverse link communications module 510 may instruct the transmitter 515 to cease transmitting communications on the reverse link communications 330. Details regarding the reverse link communications module 510 will be described below.

Figure 5B:
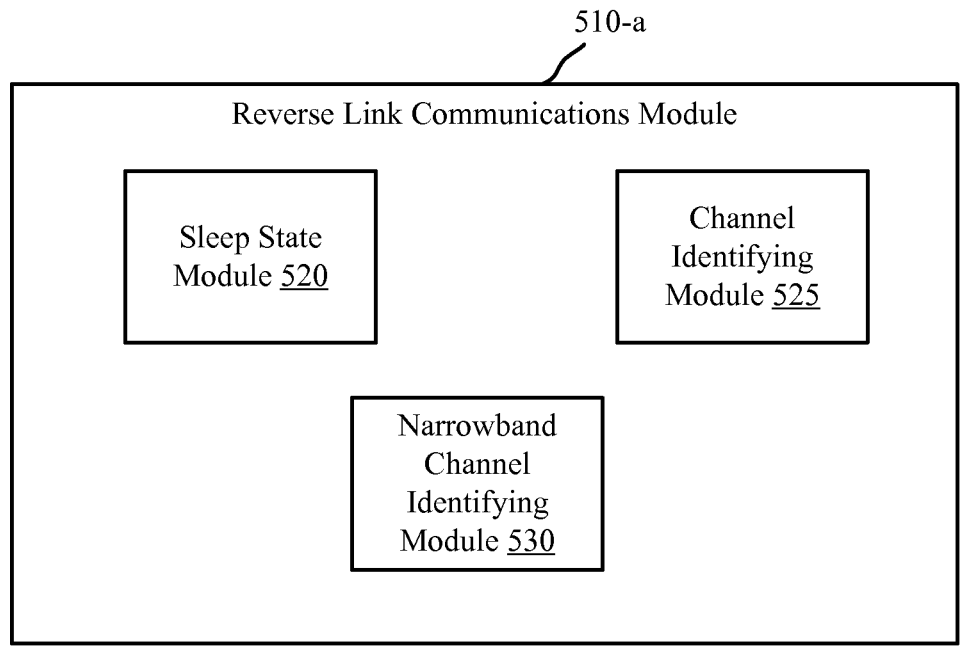
FIG. 5B is a block diagram illustrating one embodiment of a reverse link communications module.

FIG. 5B is a block diagram illustrating one embodiment of a reverse link communications module 510-a. The module 510-a may be an example of the reverse link communications module of FIG. 5A. In one example, the module 510-a may include a sleep state module 520, a channel identifying module 525, and a narrowband channel identifying module 530.

In one configuration, the sleep state module 520 may allow an M2M device 115 to wake up long enough to receive a message from a base station 105 and then return to a sleep state to conserve power. The base station may transmit a message to the M2M device using a forward link frame. The frame may include a paging channel to carry the message. The paging channel may include a number of sub-channels. The base station may transmit a copy of the message in each sub-channel. When the M2M device successfully receives and demodulates the message on one of the sub-channels, the sleep state module 520 may cause the M2M device 115 to turn off its radio and return to a sleep state to conserve the battery without sending an ACK message back to the base station.

In one embodiment, the channel identifying module 525 may identify a reverse link channel to use based at least in part on the RoT level of the channel. As previously explained, the operating band of the reverse link may be divided into multiple reverse link frequency channels. Within each frequency channel, CDMA may be implemented for multiple user multiplexing. Each frequency channel may have its own target RoT operation point. At least one frequency channel may be dedicated as a low data rate random access channel with a low RoT operation point.

In one example, the narrowband channel identifying module 530 may identify a narrowband channel to use to transmit data on the reverse link based at least in part on the status of the channel. In one embodiment, the operating band of the reverse link may be divided into a number of narrowband FDMA frequency channels. A busy or idle status of each narrowband channel may be broadcasted to each M2M device 115. The devices may contend for a channel that is selected randomly from the idle set of channels by sending a preamble of a data packet intended to be transmitted on the reverse link. After the preamble is transmitted, the module 530 may transmit data on the reverse link using the channel if the channel is either implicitly or explicitly assigned to the M2M device. While the M2M device is transmitting data on a channel that has been either implicitly or explicitly assigned, the transmission of the data on the channel may not be interrupted by another M2M device attempting to transmit a data packet using the same channel.

Figure 6:
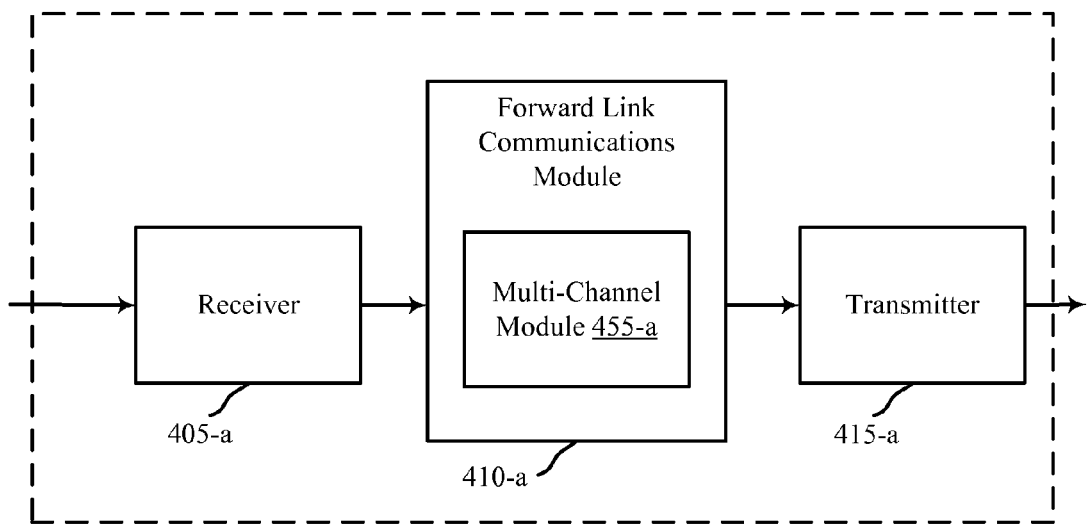
FIG. 6 is a block diagram illustrating a device for managing forward link communications in accordance with various embodiments.

FIG. 6 is a block diagram illustrating a device 600 for managing forward link communications in accordance with various embodiments. The device 600 may be an example of one or more aspects of the base station described with reference to FIGS. 1, 2, 3A, 3B, 4A, and/or 4B. The device 600 may also be a processor. The device 600 may include a receiver module 405-a, a forward link communications module 410-a, and/or a transmitter module 415-a. Each of these components may be in communication with each other.

The components of the device 600 may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The receiver module 405-a may receive information such as packet, data, and/or signaling information regarding what the device 600 has received or transmitted. The received information may be utilized by the forward link communications module 410-a for a variety of purposes, as previously described.

In one configuration, the forward link communications module 410-a may include a multi-channel module 455-a. The module 455-a may be an example of the multi-channel module 455 shown in FIG. 4B. In one configuration, the multi-channel module 455-a may divide an operating band into a number of FDMA frequency channels and broadcast the status of each channel to M2M devices in communication with the base station 105. When a channel is in use by an M2M device, the module 455-a may change the status to busy. When a data packet received on the channel has been decoded and demodulated, the status may be changed back to idle. Details regarding the assignment of FDMA frequency channels will be described below.

Figure 7:
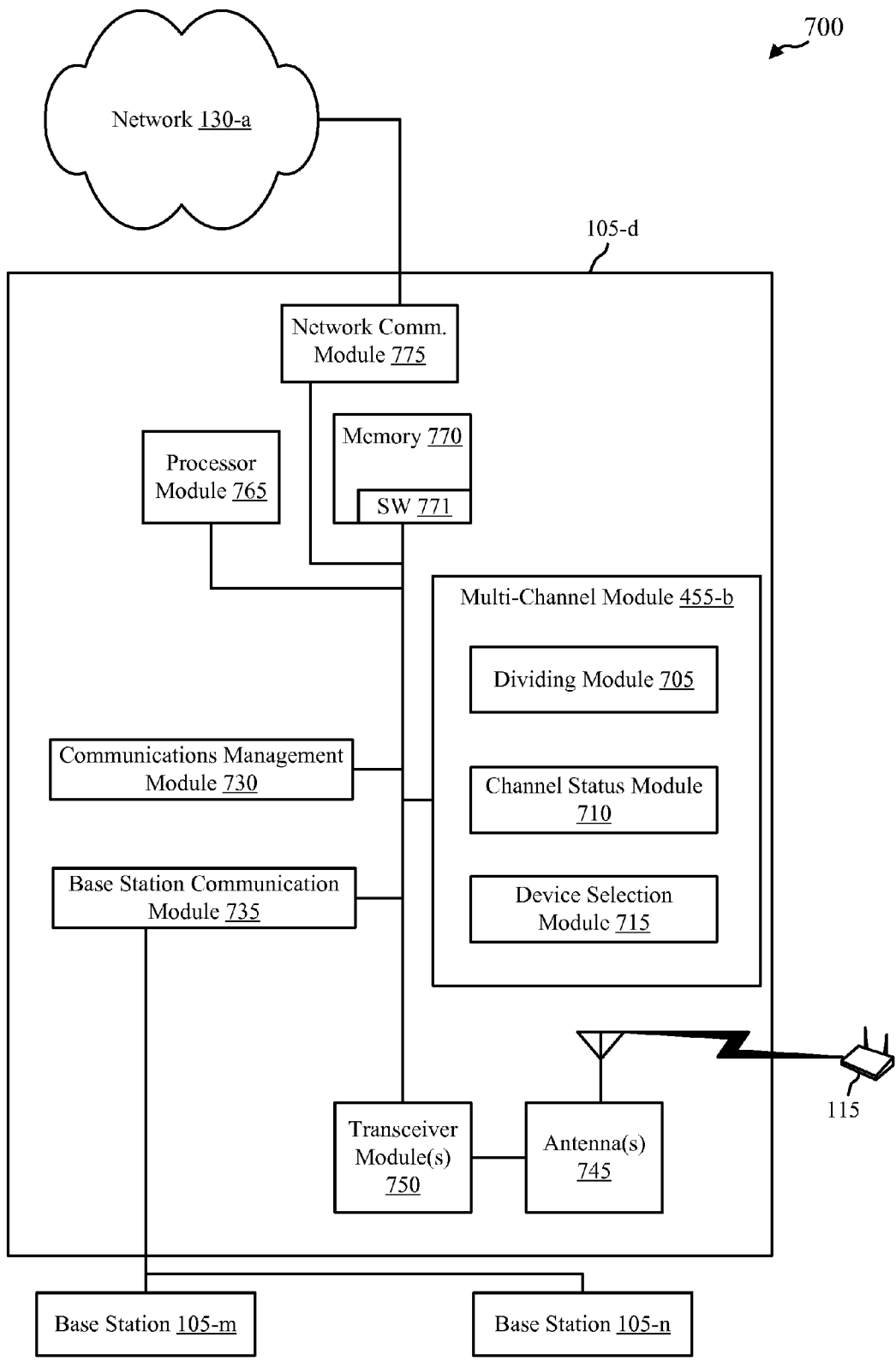
FIG. 7 shows a block diagram of a communications system that may be configured for assigning idle traffic channels on the reverse link to M2M devices in accordance with various embodiments.

FIG. 7 shows a block diagram of a communications system 700 that may be configured for creating multiple FDMA frequency channels and providing a status of each channel to M2M devices 115 in accordance with various embodiments. This system 700 may be an example of aspects of the system 100 depicted in FIG. 1, system 200 of FIG. 2, system 300 of FIG. 3A, 320 of FIG. 3B, system 400 of FIG. 4A, and/or system 600 of FIG. 6.

The system 700 may include a base station 105-d. The base station 105-d may include antennas 745, a transceiver module 750, memory 770, and a processor module 765, which each may be in communication, directly or indirectly, with each other (e.g., over one or more buses). The transceiver module 750 may be configured to communicate bi-directionally, via the antennas 745, with an M2M device 115, which may be a sensor, meter, or any other type of device capable of tracking, sensing, monitoring, etc. The transceiver module 750 (and/or other components of the base station 105-d) may also be configured to communicate bi-directionally with one or more networks. In some cases, the base station 105-d may communicate with the core network 130-a through network communications module 775.

Base station 105-d may also communicate with other base stations 105, such as base station 105-m and base station 105-n. Each of the base stations 105 may communicate with the M2M device 115 using different wireless communications technologies, such as different Radio Access Technologies. In some cases, base station 105-d may communicate with other base stations such as 105-m and/or 105-n utilizing base station communication module 735. In some embodiments, base station 105-d may communicate with other base stations through the controller 120 and/or core network 130-a.

The memory 770 may include random access memory (RAM) and read-only memory (ROM). The memory 770 may also store computer-readable, computer-executable software code 771 containing instructions that are configured to, when executed, cause the processor module 765 to perform various functions described herein (e.g., slot map generation, ACK schemes, dynamic data rate schemes for paging messages, flexible paging schemes, data traffic schemes, etc.). Alternatively, the software 771 may not be directly executable by the processor module 765 but may be configured to cause the computer, e.g., when compiled and executed, to perform functions described herein.

The processor module 765 may include an intelligent hardware device, e.g., a central processing unit (CPU) such as those made by Intel® Corporation or AMD®, a microcontroller, an application-specific integrated circuit (ASIC), etc. The transceiver module 750 may include a modem configured to modulate packets for the M2M device 115 and provide the modulated packets to the antennas 745 for transmission, and to demodulate packets received from the antennas 745. While some examples of the base station 105-d may include a single antenna 745, the base station 105-d preferably includes multiple antennas 745 for multiple links which may support carrier aggregation. For example, one or more links may be used to support macro communications with the M2M device 115.

According to the architecture of FIG. 7, the base station 105-d may further include a communications management module 730. The communications management module 730 may manage communications with other base stations 105. By way of example, the communications management module 730 may be a component of the base station 105-d in communication with some or all of the other components of the base station 105-d via a bus. Alternatively, functionality of the communications management module 730 may be implemented as a component of the transceiver module 750, as a computer program product, and/or as one or more controller elements of the processor module 765.

The components for base station 105-d may be configured to implement aspects discussed above with respect to device 600 in FIG. 6 and may not be repeated here for the sake of brevity. In one embodiment, the base station 105-d may include a multi-channel module 455-b, which may be an example of the module 455 illustrated in FIGS. 4B and/or 6. The module 445-b may include a dividing module 705, a channel status module 710, and a device selection module 715.

In one configuration, the dividing module 705 may identify the operating frequency band of the reverse link in an M2M wireless WAN. The module 705 may then divide the band into a number of narrowband FDMA frequency channels. Once the band has been divided, the channel status module 710 may determine the status of each channel. In one configuration, the status module 710 may monitor each narrowband channel to determine if signals are being received on the channel. If no signals are detected on a channel, the status module 710 may assign an idle status to the channel. If signals are detected, a busy status may be assigned to the channel.

In one embodiment, the channel status module 710 may further transition the status of a channel. If the module 710 detects a request has been received on the reverse link for a particular channel, the module 710 may transition the status of the requested channel from idle to busy. When transmissions received on this channel have been successfully decoded, the status module 710 may change the status of the channel that carried such transmissions back to idle.

In one example, multiple M2M devices 115 may submit a request for the same narrowband channel. If multiple requests are received, the device selection module 715 may determine which device is assigned the channel. In one example, the module 715 may estimate the strength of the reverse link received from each of the M2M devices 115 that have requested to use the channel. The module 715 may select the device with the strongest reverse link signal to use the narrowband channel. In another example, the device selection module 715 may identify the M2M device 115 that most recently transmitted data on the reverse link and assign the requested channel to that device 115.

In one configuration, the device selection module 715 may identify one or more M2M devices 115 that receive data on the forward link at a first data rate, a second data rate, etc. The channel status module 710 may broadcast channel status messages to a first group of identified M2M devices at a first data rate. The module 710 may also transmit the channel status message to a second group of identified devices at a second data rate, and so on.

In some embodiments, the transceiver module 750 in conjunction with antennas 745, along with other possible components of base station 105-d, may transmit a number of forward link frames that each include a traffic slot, from the base station 105-d to the M2M device 115, to other base stations 105-m/105-n, or core network 130-a. The slot map may be transmitted during the traffic slot of the first forward link frame at the beginning of a traffic channel cycle.

Figure 8:
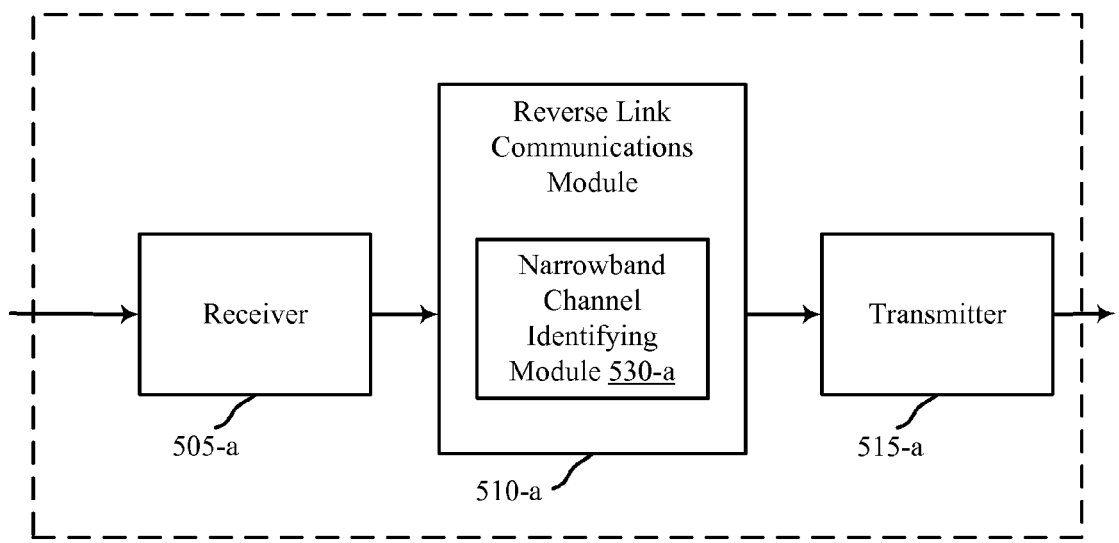
FIG. 8 is a block diagram illustrating a device for managing reverse link communications in accordance with various embodiments.

FIG. 8 is a block diagram illustrating a device 800 for managing reverse link communications in accordance with various embodiments. The device 800 may be an example of one or more aspects of the M2M device 115 described with reference to FIGS. 1, 2, 3A, 3B, and/or 5A. The device 800 may also be a processor. The device 800 may include a receiver module 505-a, a reverse link communications module 510-a, and/or a transmitter module 515-a. The reverse link communications module 510-a may include a narrowband channel identifying module 530-a. The module 520-a may be an example of the narrowband channel identifying module 530 described with reference to FIG. 5B. Each of these components may be in communication with each other.

These components of the device 800 may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The receiver module 505-a may receive information such as packet, data, and/or signaling information regarding what the device 800 has received or transmitted. The received information may be utilized by the reverse link communications module 510-a for a variety of purposes. The transmitter module 515-a may transmit a packet, data, and/or signaling information on the reverse link in a reverse link frame. The reverse link frame may include a traffic slot and no other control slots during which control information may be transmitted. The traffic slot may have a length of 20 ms during which data may be transmitted on the reverse link.

The receiver module 505-a may be configured to receive a channel status message during at least a portion of a time slot of a forward link frame. The module 530-a may identify an idle narrowband channel to use to transmit a data packet on the reverse link. The transmitter 515-a may transmit a preamble of the data packet to serve as a request for the idle narrowband channel. Upon receiving a notification that the channel has been assigned, the transmitter 515-a may transmit the data packet on the reverse link. When the status of the narrowband channel transitions back to idle, the reverse link communications module 510-a may instruct the transmitter 515-a to terminate the transmissions of the data packet. The transition of the channel status back to idle may function as an ACK message from the base station 105 indicating the data packet has been decoded and demodulated.

Figure 9:
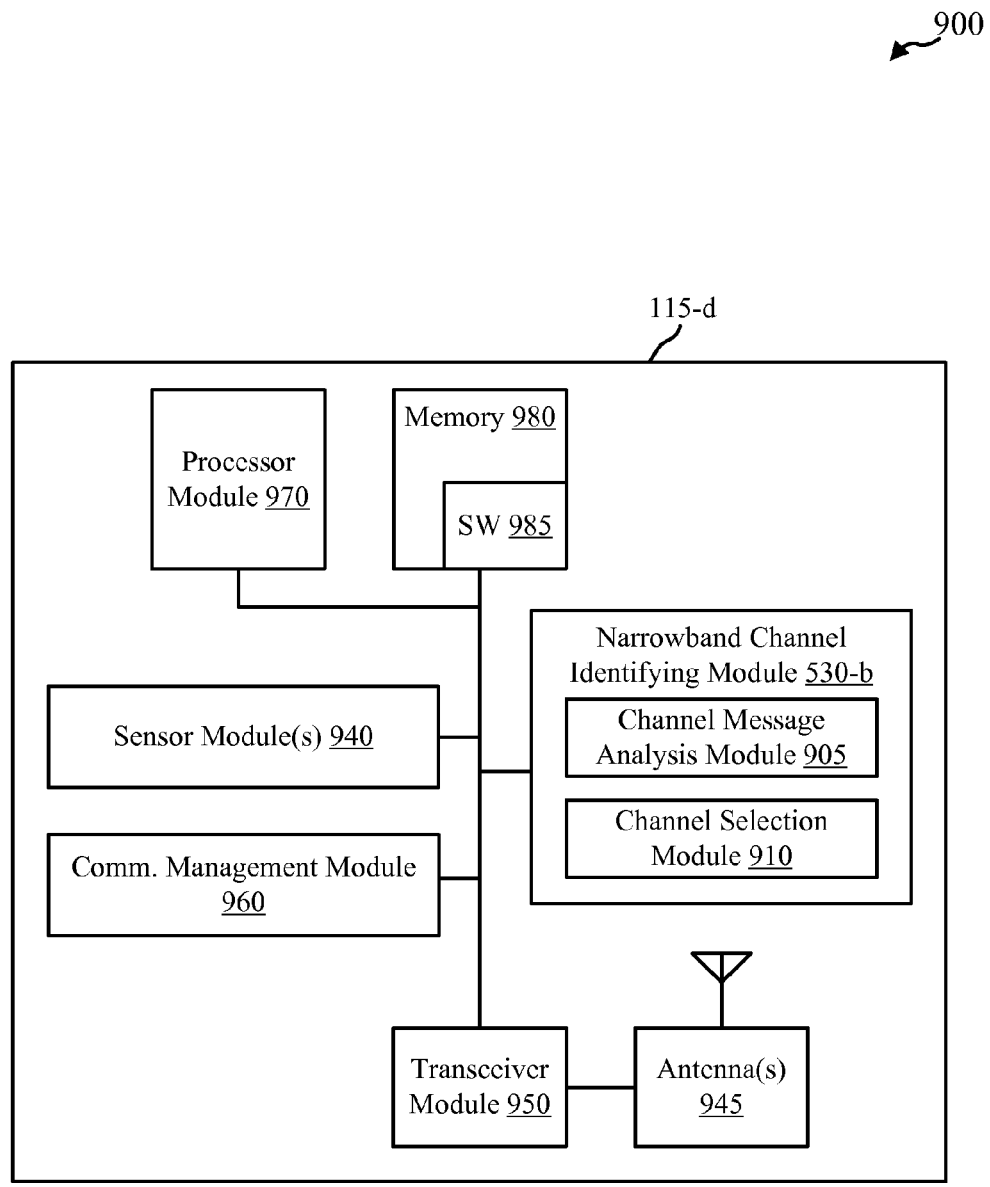
FIG. 9 shows a block diagram of a M2M device to manage consumption of power in accordance with various embodiments.

FIG. 9 shows a block diagram 900 of a M2M device 115-d to manage consumption of power in accordance with various embodiments. The M2M device 115-d may have any of various configurations, such as a sensor or monitor for various M2M applications discussed above. The M2M device 115-d may capture or sense information via sensor module(s) 940. The M2M device 115-d may have an internal power supply, such as a small battery, to facilitate mobile operation. In some embodiments, the M2M device 115-d may be the M2M device 115 described with reference to FIGS. 1, 2, 3A, and/or 3B. The M2M device 115-d may include aspects of device 500 of FIG. 5A and/or device 800 of FIG. 8. The M2M device 115-d may be a multi-mode mobile device. The M2M device 115-d may be referred to as an M2M UE or MTC device in some cases.

The M2M device 115-d may include antenna(s) 945, a transceiver module 950, memory 980, and a processor module 970, which each may be in communication, directly or indirectly, with each other (e.g., via one or more buses). The transceiver module 950 may communicate bi-directionally, via the antenna(s) 945 and/or one or more wired or wireless links, with one or more networks, as described above. For example, the transceiver module 950 may communicate bi-directionally with base stations 105 of FIGS. 1, 2, 3A, 3B and/or 7. Further, the transceiver module 950 may communication with aspects of device 400 of FIG. 4A and/or device 600 of FIG. 6. The transceiver module 950 may include a modem configured to modulate the packets and provide the modulated packets to the antenna(s) 945 for transmission, and to demodulate packets received from the antenna(s) 945. While the M2M device 115-d may include a single antenna 945, the M2M device 115-d may include multiple antennas 945 for multiple transmission links.

The memory 980 may include random access memory (RAM) and read-only memory (ROM). The memory 980 may store computer-readable, computer-executable software code 985 containing instructions that are configured to, when executed, cause the processor module 970 to perform various functions described herein (e.g., identify an idle narrowband channel, monitor channel status messages, early termination based on channel status transition, receive packets, enter a sleep state, etc.). Alternatively, the software code 985 may not be directly executable by the processor module 970 but be configured to cause the computer (e.g., when compiled and executed) to perform functions described herein. The processor module 970 may include an intelligent hardware device, e.g., a central processing unit (CPU) such as those made by Intel® Corporation or AMD®, an ASIC, a microcontroller, etc.

According to the architecture of FIG. 9, the M2M device 115-d may further include a communications management module 960. The communications management module 960 may manage communications with base stations 105 and/or other M2M devices 115. By way of example, the communications management module 960 may be a component of the M2M device 115-d in communication with some or all of the other components of the M2M device 115-d via a bus. Alternatively, functionality of the communications management module 960 may be implemented as a component of the transceiver module 950, as a computer program product, and/or as one or more controller elements of the processor module 970.

In some embodiments, M2M device 115-*d* may measure and/or capture data and transmit the data to a network without performing explicit registration on the network. In one embodiment, M2M device 115-*d* may monitor pilot signals of available base stations or network cells and select a base station or network cell for communication without explicitly registering with the base station or network cell. In some configurations, while not explicitly registered on the selected base station or network cell, M2M device 115-*d* may monitor system information for the selected base station or network cell. The system information for the selected base station or network cell may include explicit registration triggers and the M2M device 115-*d* may suppress explicit registration on a network even when one of the explicit registration triggers is detected. For example, the M2M device 115-*d* may suppress registrations based on one or more registration triggers such as device power up/power down, frequency/band class changes, time period-based registration, movement-based registration, zone-based registration, and/or parameter change based registration.

The system information may include access parameters for use in accessing the selected base station or network cell. The M2M device 115-*d* may capture or measure information related to an event (e.g., via sensor module(s) 940) and transmit that information to the selected base station or network cell as part of a network access prior to, or without performing, explicit registration on the selected base station or network cell. The network access may be performed using one or more of the access parameters. The M2M device 115-*d* may be implicitly registered by the selected base station or network cell as part of the network access transmitting the captured or measured event data to the selected base station or network cell.

Suppressing registration may also allow M2M device 115-*d* to select the best network cell for transmissions without regard to the power penalty incurred in registering with a target cell. For example, M2M device 115-*d* may select between available networks based on the estimated power consumption for communication with the respective networks without accounting for the power penalty that would be incurred by performing an explicit handover (with an explicit registration on the new network).

The components for M2M device 115-*d* may be configured to implement aspects discussed above with respect to device 500 of FIG. 5A and/or device 800 of FIG. 8 and may not be repeated here for the sake of brevity. In one example, the M2M device 115-*d* may include a narrowband channel identifying module 530-*b*, which may be an example of the narrowband channel identifying module 530 of FIG. 5A and/or FIG. 8. The module 530-*a* may include a channel message analysis module 905 and a channel selection module 910. The module 905 may analyze a channel status message received during at least a portion of an uplink control slot of a forward link frame. The analysis module 905 may determine which narrowband channels for communication on the reverse link are available. Based on the analysis, the channel selection module 910 may randomly select a channel that has been identified as having an idle status. If more then one M2M device 115 contends (i.e., requests) access to the same channel, the base station 105, as previously described, will select an M2M device 115 and will provide information explicitly identifying the selected M2M device 115. The channel selection module 910 may randomly select another idle channel if the M2M device is not selected to use the requested channel.

Figure 10A:
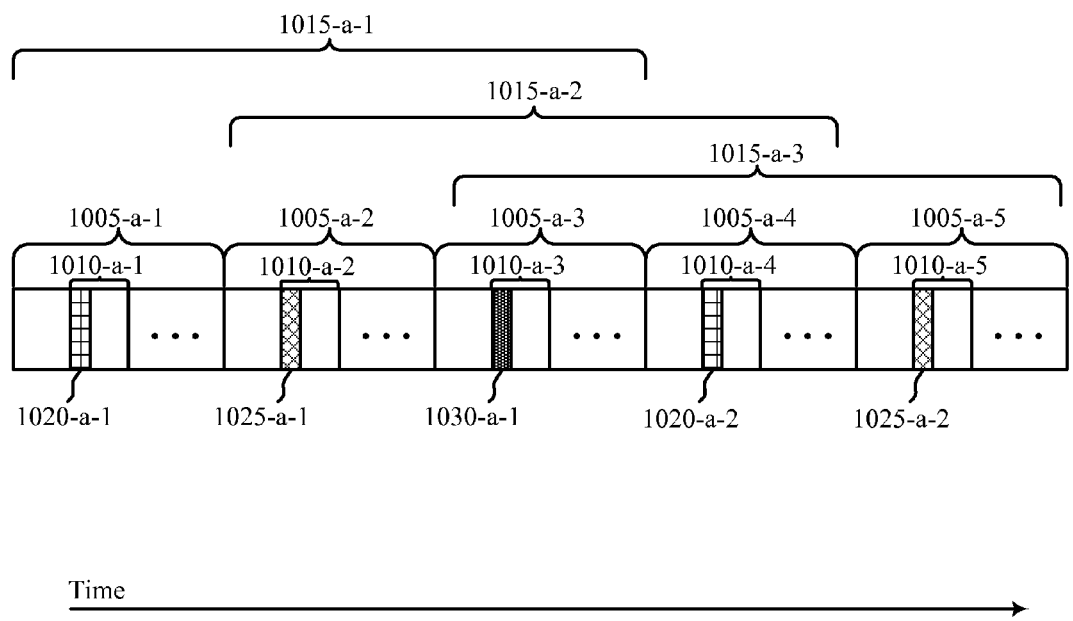
FIG. 10A is a block diagram illustrating one embodiment of multiple forward link frames that include one or more channel status messages.

FIG. 10A is a block diagram illustrating one embodiment 1000 of multiple forward link frames 1005 that include an uplink control slot 1010. A channel status message 1020, 1025, or 1030 may be transmitted during the uplink control slot 1010 of a frame 1005 using an UCC. The channel status messages 1020, 1025, and 1030 may include status information for one or more narrowband FDMA frequency channels that may be used for reverse link communications.

As previously stated, the operating band of the reverse link may be divided into multiple narrowband frequency channels. In one example, the operating band may include 256 kilo Hertz (kHz) of uplink spectrum. This may be divided into 100 narrowband carries, each of bandwidth 2.56 kHz. In one configuration, each reverse link frequency channel may include one or two consecutive narrowband carriers. In one embodiment, the total number of narrowband frequency channels may be divided into a number of groups. In one example, the channels may be organized into three groups. The frequency channels in a first group may be used by M2M devices that receive data on the forward link at 10 kilo bits per second (kbps) and transmit data on the reverse link at 200 bits per second (bps). Channels in a second group may be used by devices that receive data at 20 kbps on the forward link and transmit data on the reverse link at 400 bps. In one configuration, a third group of channels may be used by M2M devices that receive forward link data at 40 kbps or higher and transmit reverse link data at 800 bps or higher. In one embodiment, the channels referred to herein in the channel status messages may be logical channels. The physical narrowband channels may hop from one frequency to another during a subsequent reverse link frame in a pseudo random manner.

In one embodiment, each forward link frame 1005 may transmit a channel status message 1020, 1025, or 1030 for a particular channel group. A first forward link frame 1005-*a*-1 may transmit a first occurrence of a first group channel status message 1020-*a*-1 during an uplink control slot 1010-*a*-1. The message 1020-*a*-1 may be transmitted during all or a portion of a time slot 1010-*a*-1 of the first frame 1005-*a*-1. In one embodiment, the first occurrence of the first message 1020-*a*-1 may be transmitted during a portion of an uplink control slot 1010-*a*-1. The message 1020-*a*-1 may include channel status information for narrowband FDMA frequency channels that may be used by M2M devices 115 that receive forward link data and transmit reverse link data at a first data rate (e.g., 10 kbps on the forward link and 200 bps on the reverse link).

At a second forward link frame 1005-*a*-2, a first occurrence of a second channel status message 1025-*a*-1 may be transmitted during a portion of the uplink control slot 1010-*a*-2. The second message 1025-*a*-1 may include channel status information for channels available to M2M devices that receive and transmit data at a second data rate, which may be higher than the first data rate. For example, the second data rate may be 20 kbps on the forward link and 400 bps on the reverse link.

At a third forward link frame 1005-*a*-3, a first occurrence of a third channel status message 1030-*a*-1 may be transmitted during a portion of the uplink control slot 1010-*a*-3. The third message 1030-*a*-1 may include channel status information for channels available to M2M devices that receive and transmit data at a third data rate, which may be higher than the first and second data rates. In one embodiment, the third data rate may be 40 kbps (or higher) on the forward link and 800 bps (or higher) on the reverse link. While it is shown that the first channel status message 1020-*a*-1 begins to be transmitted in the first frame 1005-*a*-1, the second message 1025-*a*-1 begins in the second frame 1005-*a*-2, and the third message 1030-*a*-1 begins in the third frame, it is to be understood that the any channel message for a particular group of M2M devices may be transmitted before or after a channel message for another group of M2M devices.

As illustrated, the first channel message 1020 may be transmitted in the first, and fourth frames. The second message 1025 may be transmitted in the second and fifth frames, while the third channel message 1030 may be transmitted in the third and a sixth frame (not shown).

In one embodiment, M2M devices may wake up during certain uplink control slots 1010 to receive a channel status message that includes status information for narrowband channels the devices use to transmit on the reverse link. In one configuration, M2M devices that receive and transmit at the first data rate may wake up to monitor the uplink control slots 1010 of the first and fourth frames. M2M devices may become aware of when to monitor for channel status messages based on the forward link data rate it can receive and the system information received from a base station 105. In an additional embodiment, each M2M device may be pre-programmed to wake up during certain slots to monitor for channel status messages.

In one configuration, a number of frames 1005 may form an uplink transmission unit (UTU) 1015. In one embodiment, three (i.e., each 40 ms) may form a single UTU 1015. As illustrated, the first, second, and third frames joined together may form a first UTU 1015-a-1. The second, third, and fourth frames may form a second UTU 1015-a-2, and the third, fourth, and fifth frames may form a third UTU 1015-a-3. The first, second, and third UTUs may be staggered from each other by a single frame. During each UTU, a channel status bit for each channel may be transmitted to a specific group of M2M devices in a channel status message. In one embodiment, an M2M device may transmit on the reverse link during a uplink traffic slot of one or more consecutive frames. For example, an M2M device 115 in a first group of M2M devices may monitor the uplink control slot 1010-a-1 of the first frame 1005-a-1. During the uplink traffic slot of the next three frames (i.e., a 20 ms time slot), the device may transmit a request to use a channel identified as idle in the first channel status message 1020-a-1. As a result, the first M2M device 115 may transmit the request on the reverse link during a first UTU 1015-a-1. Similarly, a second M2M device may identify an idle channel from the second channel status message 1025-a-1 and transmit a request on the reverse link during a second UTU 1015-a-2, and a third M2M device may identify an idle channel from the third channel status message 1030-a-1 and may transmit a request to use the idle channel during a third UTU 1015-a-3.

Upon receiving and decoding a second occurrence of the first channel status message 1020-a-1 within the fourth frame 1005-a-4, the M2M device that transmitted the request to use a channel identified as being idle in the first occurrence of the first status message 1020-a-1 may determine whether the status of this channel has transitioned from an idle status to a busy status. If the status has transitioned to a busy status, and no other channel assignment information for that channel is included in the second occurrence of the message 1020-a-2, the M2M device may conclude that it has been assigned this channel to use for reverse link transmissions. The M2M device may then transmit a data packet using this channel during one or more subsequent reverse link frames. The M2M device may terminate transmission of the data packet when it detects the status of the channel has transitioned back to an idle status during a subsequent occurrence of the first channel status message. In addition, the transmissions may be terminated when a number of data packet transmissions have been executed during a maximum number of traffic slots on the reverse link.

While three UTUs 1015 are illustrated, it is to be understood that more or less UTUs may be used with the present systems and methods. For example, two groups of M2M devices may exist. The first group may receive/transmit at a low data rate and the second group may receive/transmit at a high data rate. If two groups exist, the length of each UTU may be 40 ms. As a result, during a first frame, a first channel status message may be transmitted at the low data rate to the first group of M2M devices. A device may select an idle channel and transmit a request during the next two reverse link frames (i.e., a 40 ms time slot).

Figure 10B:
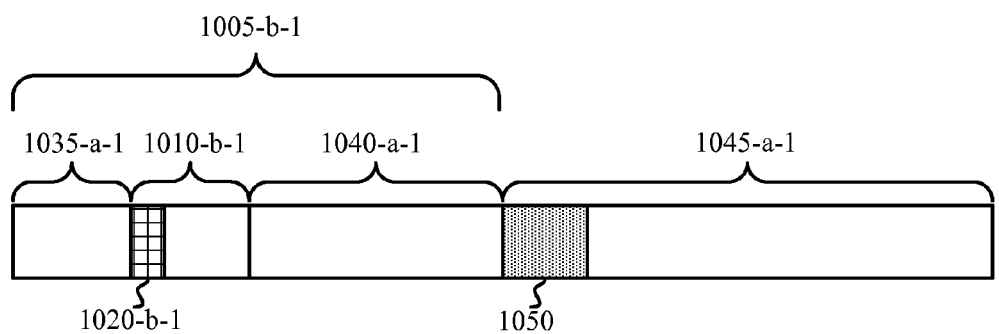
FIG. 10B is a block diagram illustrating one example of assigning an M2M device to a narrowband frequency division multiple access (FDMA) channel to transmit a data packet on the reverse link.
Figure 10B:
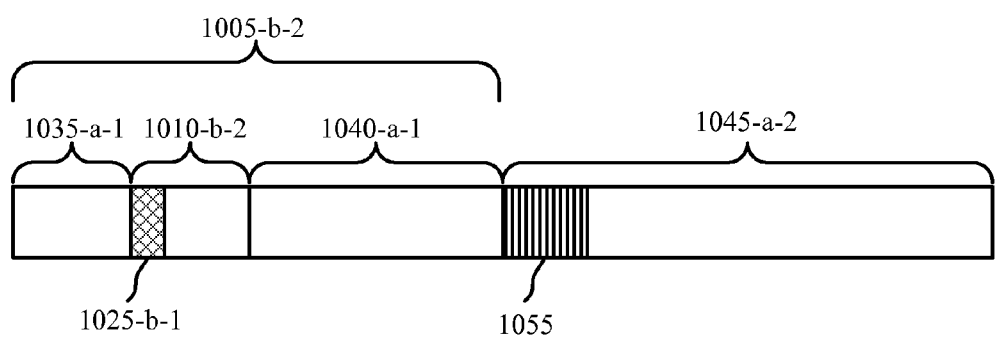

FIG. 10B is a block diagram illustrating one example 1065 of requesting a narrowband FDMA channel to transmit a data packet on the reverse link. In one configuration, at a time t1, a first forward link frame 1005-b-1 may be transmitted on the forward link. The first frame 1005-b-1 may be an example of the forward link frames 1005 shown in FIG. 10A. The frame 1005-b-1 may include a number of different time slots. In one embodiment, the first frame 1005-b-1 may include a paging slot 1035-a-1, an uplink control slot 1010-b-1, and a forward traffic slot 1040-a-1. The length of the paging and uplink control slots may be 5 ms. The length of the forward traffic slot may be 10 ms. In one configuration, a first reverse link frame 1045-a-1 may follow the first forward link frame 1005-b-1. The reverse link frame 1045-a-1 may include a single slot for traffic on the reverse link. The reverse link frame 1045-a-1 may have a length of 20 ms.

In one embodiment, at the time t1, a first occurrence of a first channel status message 1020-b-1 may be transmitted. The message 1020-b-1 may be transmitted during all or a portion of the uplink control slot 1010-b-1. The message 1020-b-1 may be transmitted at a specific data rate. M2M devices that receive data at that specific data on the forward link may monitor the uplink control slot 1010-b-1 to receive the message 1020-b-1. Upon decoding the message, an M2M device may identify the channels that are available or idle (e.g., a "0" bit is set for these channels in the message). The M2M device may randomly select one of the idle channels and transmit a preamble 1050 of a data packet during a portion of one or more reverse link frames 1045. In this example, the preamble 1050 may be transmitted during the first reverse link frame 1045-a-1 following the first forward link frame 1005-b-1. In other examples, the preamble 1050 may be transmitted during subsequent reverse link frames 1045. The preamble 1050 may serve as a request to use the selected idle channel to transmit the data packet.

At a time t2, a second forward link frame 1005-b-2 may be transmitted. The first and second forward link frames may be consecutive transmissions on the forward link. During the uplink control slot 1010-b-2 of the second frame 1005-b-2, a second channel status message 1025-b-1 may be transmitted during a portion of the uplink control slot 1010-b-2.

In one embodiment, a second M2M device may identify an idle channel from the second channel status message 1025-b-1 and transmit a preamble 1055 during a portion of one or more reverse link frames 1045. In this example, the preamble may be transmitted during a portion of a second reverse link frame 1045-a-2. In other examples, the preamble 1055 may be transmitted during subsequent reverse link frames. The preamble 1055 may represent a request by the second M2M device to use a particular channel identified as being idle in the second channel status message 1025-b-1.

Figure 10C:
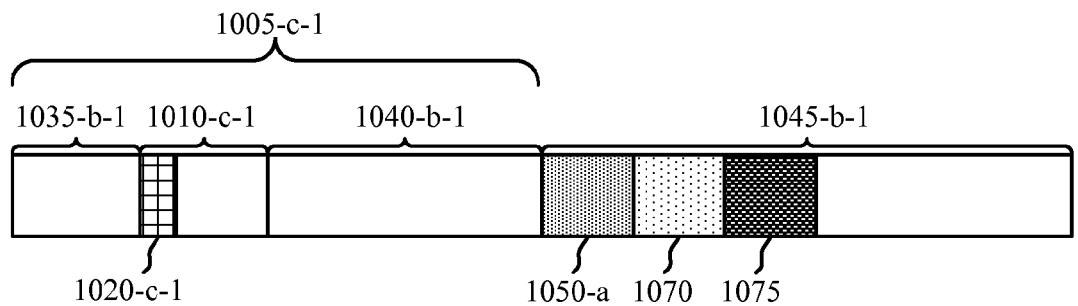
FIG. 10C is a block diagram illustrating one embodiment of contending for a narrowband frequency channel to transmit a data packet on the reverse link.
Figure 10C:
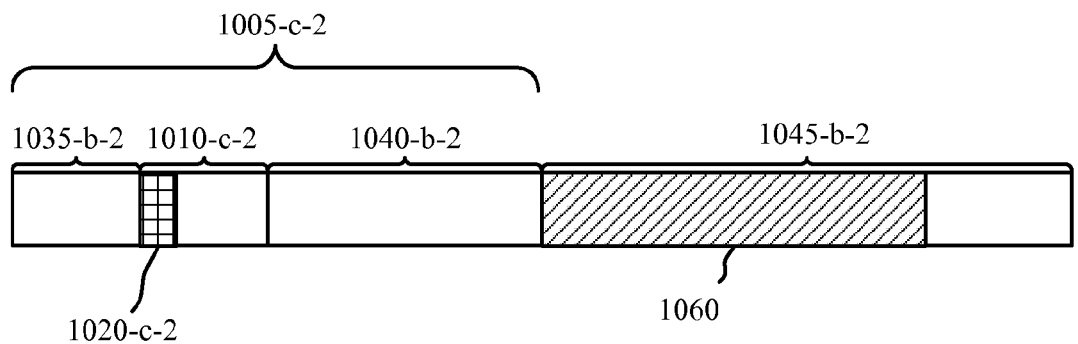

FIG. 10C is a block diagram illustrating one embodiment 1080 of contending for a narrowband frequency channel to transmit a data packet 1060 on the reverse link. At a time t1, a first forward link frame 1005-c-1 may be transmitted. The frame 1005-c-1 may be an example of the frames 1005 shown in FIGS. 10A and/or 10B. A first occurrence of a first channel status message 1020-*c*-1 may be transmitted during a portion of an uplink control slot 1010-*c*-1 of a first forward link frame 1005-*c*-1. In one configuration, the message 1020-*c*-1 may be broadcasted to a first group of M2M devices that receive and transmit at a particular data rate. The message 1020-*c*-1 may include status information for channels to be used by M2M devices receiving and transmitting at a certain data rate. The M2M devices may decode the message 1020-*c*-1 and identify the channels indicated to be idle. One or more M2M devices may select a particular channel from the set of idle channels and transmit a preamble of their respective data packets in one or more reverse link frames 1045. In this example, the preambles may be transmitted in a first reverse link frame 1045-*b*-1 following the first forward link frame 1005-*c*-1. In other example, a first preamble 1050-*a* may be transmitted in the first reverse link frame 1045-*b*-1 while the additional preambles 1070 and 1075 may be transmitted in different reverse link frames. In this example, three M2M devices may randomly select the same idle frequency channel. The first, second, and third, M2M devices may each desire to transmit a first, second, and third data packet, respectively. As a result, a first preamble 1050-*a* for the first data packet may be transmitted during a portion of a traffic slot of a reverse link frame 1045. In addition, a second preamble 1070 for a second data packet may be transmitted as well as a third preamble for a third data packet 1075.

Upon receiving the preambles representing a request for the idle channel on the one or more reverse link frames 1045, the base station 105 may select one of the M2M devices to assign to the channel. In one embodiment, the base station 105 may estimate a strength of the reverse link received from each of the three M2M devices. The M2M device with the strongest reverse link signal may be selected to use the channel. In one configuration, the base station 105 may identify the M2M device that most recently transmitted on the reverse link and assign the channel to this device. The base station 105 may also use additional factors and criteria when selecting between two or more M2M devices that are contending for a specific idle frequency channel.

Upon selecting an M2M device to assign to the idle channel, the base station 105 may change the status of the idle channel to a busy status in a second occurrence of the first channel status message 1020-*c*-2. The base station 105 may further insert explicit channel assignment information as part of (or separate from) the message 1020-*c*-2. The assignment information may identify the selected M2M device. For example, a compressed version of the selected device's network ID may be used as the assignment information. In one configuration, the assignment may be performed by mapping the detected preambles transmitted on the contended channel to the assigned frequency channels.

At a time t2, which is subsequent to the time t1, a second forward link frame 1005-*c*-2 may be transmitted. During an uplink control slot 1010-*c*-2, a second occurrence of the first channel status message 1020-*c*-2 may be broadcasted to the first group of M2M devices.

M2M devices in the first group may decode the second occurrence of the first channel status message 1020-*c*-2. The three M2M devices that requested the use of the idle channel may detect whether or not the status of the channel has changed to a busy status in the second occurrence of the message 1020-*c*-2. Upon detecting a transition of the status to busy, the devices may also determine whether additional channel assignment information is included in the message 1020-*c*-2. The additional channel assignment information may also be transmitted separately from the message during a different portion of the uplink control slot 1010-*c*-2. In this example, the three devices may detect the additional channel assignment information. The device identified in the additional information as the device assigned to the channel may begin transmitting its data packet 1060 during a traffic slot of one or more reverse link frames 1045. The two M2M devices that were not assigned the channel may identify the idle channels using the second occurrence of the message 1020-*c*-2 and retransmit preambles to request the use of a particular idle channel.

In one embodiment, M2M devices may re-contend (i.e., re-request) for the use of a channel if there is not implicit (e.g., status change) or explicit assignment made within a certain time period. This may occur if the base station fails to detect a transmitted preamble. In addition, there may be a collision of multiple preambles transmitted on the same frequency channel. Preamble collision may occur when two devices use the same preamble on the same channel at the same time but different phases. To facilitate the detection of preamble collision, the start time of the preamble transmission from a device may be randomized within a 16 symbol window.

Upon receiving a data packet, such as the data packet 1060, the base station 105 may attempt to decode and demodulate the packet. When the base station 105 is able to process the data packet 1060, the base station 105 may transition the status of the channel used to carry the data packet on the reverse link from a busy status to an idle status. This change in the status may be identified by the M2M device assigned to that channel during the next broadcast of the channel status message. Upon detecting a transition from busy to idle, the M2M device may become aware that the data packet has been successfully decoded by the base station 105. As a result, the M2M device may terminate transmission of the data packet on the reverse link. Thus, the present systems and methods may provide for early termination of reverse link communications by altering the status of a narrowband frequency channel used to carry the transmissions.

If the control channel cannot be decoded during an uplink cycle, then the channel status information may not be available for the next reverse link slot. Based on the received signal power, an M2M device may estimate its data rate for the reverse link. If the current data rate used to transmit the data packet is higher than the estimated rate, then the device may continue to transmit using the frequency channel. Otherwise the device may terminate transmission and wait for an ACK message through a paging or traffic channel of a subsequent forward link frame. If the ACK is not received within a certain time period, the device re-transmit the data packet 1060.

In one embodiment, multiple packets may be transmitted on a dedicated channel. A subset of frequency channels in each group of channels may be reserved for assigned access (i.e., dedicated channels). These channels may be used for random access as well, if available. For example, these channels reserved for assigned access may be contended for by a device if the device detects that the channel has an idle status for two or more consecutive cycles.

Figure 11:
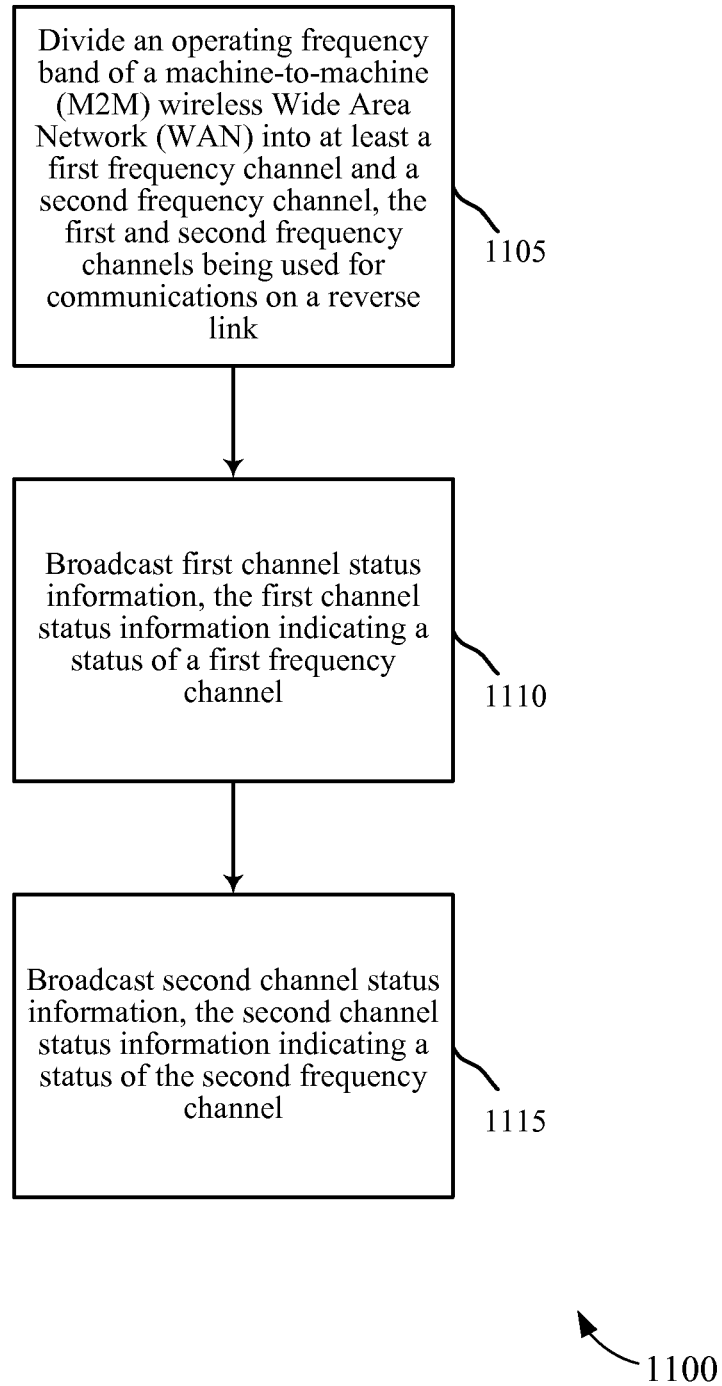
FIG. 11 is a flow chart illustrating one example of a method for conserving power of M2M devices by managing reverse link communications.

FIG. 11 is a flow chart illustrating one example of a method 1100 for conserving power of M2M devices by managing reverse link communications. For clarity, the method 1100 is described below with reference to the base station 105 shown in FIG. 1, 2, 3A, 3B, 4A, 6, or 7. In one implementation, the multi-channel module 455 may execute one or more sets of codes to control the functional elements of the base station 105 to perform the functions described below.

At block 1105, an operating frequency band of an M2M wireless WAN may be divided into at least a first frequency channel and a second frequency channel. The first and second channels may be used for communications on a reverse link. In one embodiment, the channels may be accessed by multiple devices via FDMA multiple access techniques.

At block 1110, first channel status information may be broadcasted. The information may indicate a status of a first frequency channel. For example, the information may indicate whether the first channel is idle or busy. At block 1115, second channel status information may also be broadcasted. The information for the second channel may indicate a status of the second frequency channel.

Therefore, the method 1100 may provide for efficient management of a power supply of M2M devices by managing communications on the reverse link by broadcasting which channels are available for reverse link communications. It should be noted that the method 1100 is just one implementation and that the operations of the method 1100 may be rearranged or otherwise modified such that other implementations are possible.

Figure 12:
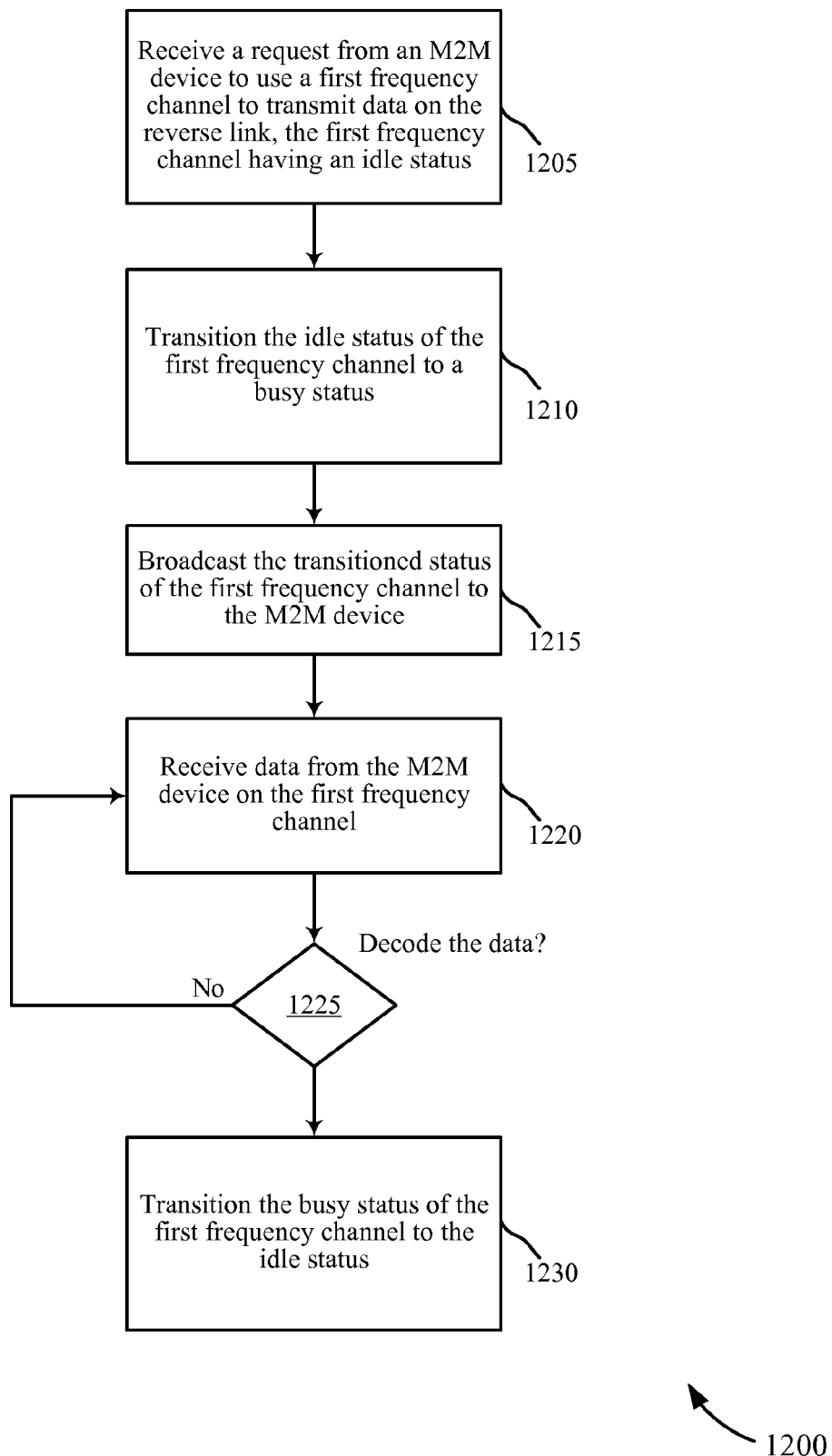
FIG. 12 is a flow chart illustrating one example of a method for conserving the power of M2M devices by transitioning the status of a channel to trigger early termination of transmissions on the reverse link.

FIG. 12 is a flow chart illustrating one example of a method 1200 for conserving the power of M2M devices by transitioning the status of a channel to trigger early termination of transmissions on the reverse link. For clarity, the method 1200 is described below with reference to the base station 105 shown in FIG. 1, 2, 3A, 3B, 4A, 6, or 7. In one implementation, the multi-channel module 455 may execute one or more sets of codes to control the functional elements of the base station 105 to perform the functions described below.

At block 1205, a request may be received from an M2M device to use a first frequency channel to transmit a data packet on the reverse link. The first frequency channel may currently have an idle status. At block 1210, the idle status of the first frequency channel may be transitioned to a busy status. This may be done by switching a single bit for the channel in a channel status message from a "0" to a "1" to indicate the channel is busy. At block 1215, the transitioned status of the first frequency channel may be broadcasted to the M2M device.

At block 1220, data may be received from the M2M device on the first frequency channel. The data may be received during a traffic slot of a reverse link frame. At block 1225, a determination may be made as to whether the received data can be decoded. If it is determined that the data cannot be decoded, the method 1200 may return to receive the data on the first frequency channel. If, however, it is determined that the data is decoded, at block 1230, the busy status of the first frequency channel may be transitioned to the idle status. The updated status may be broadcasted to the M2M device. Upon receiving the transitioned status, the M2M device may terminate transmission of the data on the first frequency channel, thus conserving power.

Therefore, the method 1200 may provide for saving power and other resources of M2M devices broadcasting the status of a channel which may trigger early termination on the reverse link. It should be noted that the method 1200 is just one implementation and that the operations of the method 1200 may be rearranged or otherwise modified such that other implementations are possible.

Figure 13:
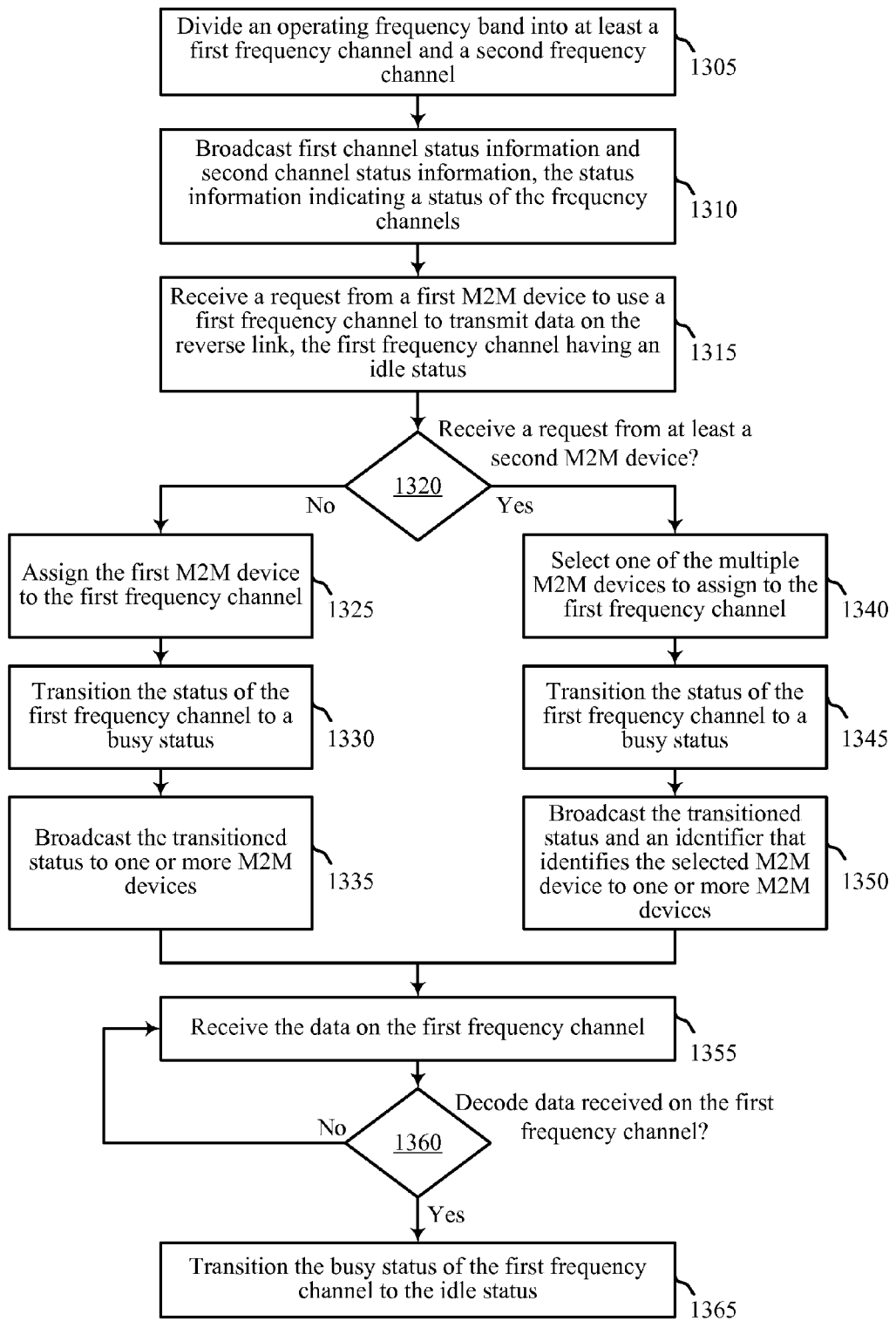
FIG. 13 is a flow chart illustrating one example of a method for conversing power of an M2M device by managing assignments of frequency channels in the reverse link.

FIG. 13 is a flow chart illustrating one example of a method 1300 for conversing power of an M2M device by managing assignments of frequency channels in the reverse link. For clarity, the method 1300 is described below with reference to the base station 105 shown in FIG. 1, 2, 3A, 3B, 4A, 6, or 7. In one implementation, the multi-channel module 455 may execute one or more sets of codes to control the functional elements of the base station 105 to perform the functions described below.

At block 1305, an operating frequency band of reverse link communications may be divided into at least a first frequency channel and a second frequency channel. At block 1310, first channel status information and second channel status information may be broadcasted to a group of one or more M2M devices. The status information may indicate the status of the channels.

At block 1315, a request may be received from a first M2M device to use the first frequency channel to transmit data on the reverser link. The first frequency channel may have an idle status. At block 1320, a determination may be made as to whether a request to use the first frequency channel is received from at least a second M2M device. If it is determined that no other request is received for the first frequency channel, at block 1325, the first M2M device may be assigned to use the channel. At block 1330, the status of the first frequency channel may transition from the idle status to a busy status. At block 1335, the transitioned status may be broadcasted to the first group of one or more M2M devices.

If, however, it is determined that a request to use the first channel has been received from at least a second M2M device, at block 1340, one of the multiple M2M devices that sent a request for the first channel may be selected and assigned to the first frequency channel. At block 1345, the status of the first frequency channel may be transitioned from the idle status to the busy status. At block 1350, the transitioned status and an identifier may be broadcasted to the first group of one or more M2M devices. The identifier may identify the selected M2M device that has been assigned to use the first frequency channel.

At block 1355, data may be received on first frequency channel from the M2M devices that is assigned to use that channel. At block 1360, a determination may be made as to whether the data is decoded. If the data is not decoded, the method 1300 may return to continue receiving the data on the first frequency channel. If, however, it is determined that the data is decoded, at block 1365, the busy status of the first frequency channel may transition to the idle status.

Therefore, the method 1300 may provide for efficient management of power of M2M devices 115 by assigning a frequency channel to a specific device. It should be noted that the method 1300 is just one implementation and that the operations of the method 1300 may be rearranged or otherwise modified such that other implementations are possible.

Figure 14:
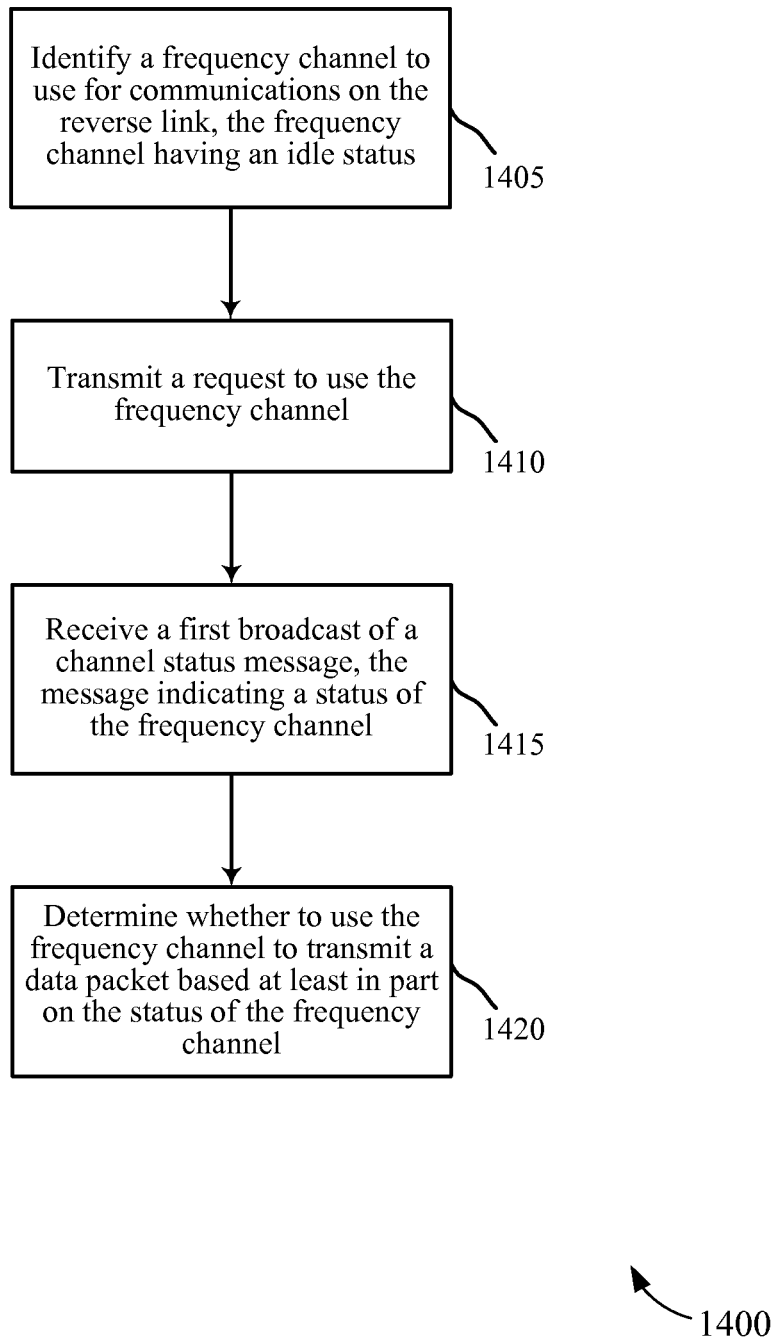
FIG. 14 is a flow chart illustrating one embodiment of a method for selecting a narrowband frequency channel to use for reverse link transmissions.

FIG. 14 is a flow chart illustrating one embodiment of a method 1400 for selecting a narrowband frequency channel to use for reverse link transmissions. For clarity, the method 1300 is described below with reference to an M2M device 115 shown in FIGS. 1, 2, 3A, 3B, 5A, 8 and/or 9. In one implementation, the narrowband channel identifying module 530 may execute one or more sets of codes to control the functional elements of the M2M device 115 to perform the functions described below.

At block 1405, a frequency channel may be identified to use for communications on the reverse link. The frequency channel may have an idle status. At block 1410, a request to use the frequency channel may be transmitted. At block 1415, a first broadcast may be received. The first broadcast may include a channel status message. The message may indicate the status of the frequency channel. At block 1420, a determination may be made as to whether to use the frequency channel to transmit a data packet on the reverse link. In one configuration, the determination may be based at least in part on the status of the frequency channel received in the broadcast.

Therefore, the method 1400 may provide for selecting and requesting the use of frequency channel to transmit on the reverse link. It should be noted that the method 1400 is just one implementation and that the operations of the method 1400 may be rearranged or otherwise modified such that other implementations are possible.

Figure 15:
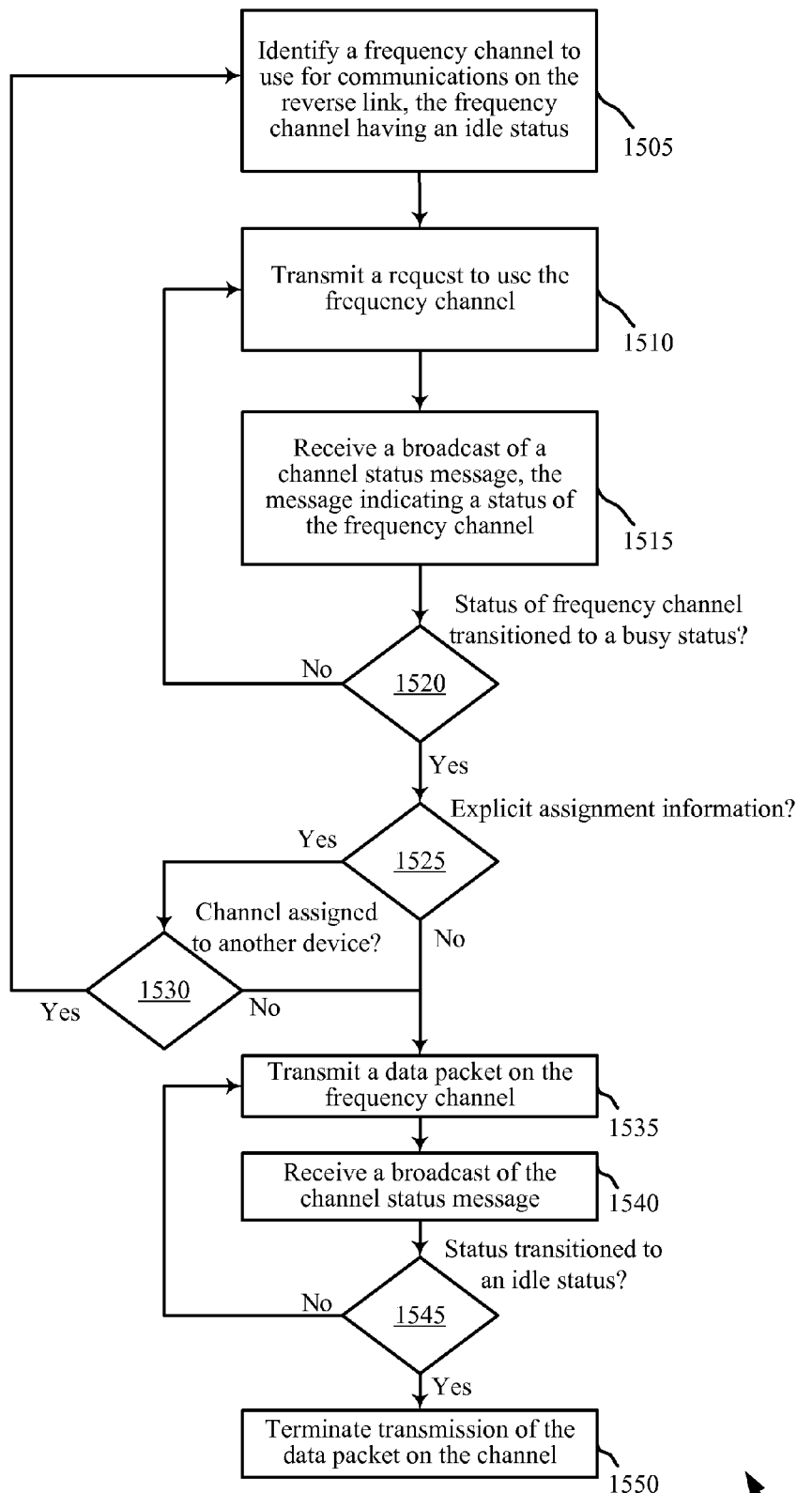
FIG. 15 is a flow chart illustrating one embodiment of a method for conserving power of an M2M device by identifying and selecting a narrowband frequency channel to use for reverse link transmissions.

FIG. 15 is a flow chart illustrating one embodiment of a method 1500 for conserving power of an M2M device by identifying and selecting a narrowband frequency channel to use for reverse link transmissions. For clarity, the method 1300 is described below with reference to an M2M device 115 shown in FIGS. 1, 2, 3A, 3B, 5A, 8 and/or 9. In one implementation, the narrowband channel identifying module 530 may execute one or more sets of codes to control the functional elements of the M2M device 115 to perform the functions described below.

At block 1505, a frequency channel may be identified to use for communications on the reverse link. The identified frequency channel may be idle. At block 1510, a request to use the frequency channel may be transmitted. For example, a preamble of a data packet may be transmitted to serve as the request to use the frequency channel. The request may be transmitted using the requested frequency channel. If a collision occurs due to another request being sent on the same channel from another M2M device, a different idle channel may be identified and the request may be sent again using the different channel.

At block 1515, a broadcast may be received. The broadcast may include a channel status message. The message may indicate a status of the requested frequency channel. At block 1520, a determination may be made as to whether the status of the requested frequency channel has transitioned to a busy status. If it is determined that the status has not transitioned (i.e., the status remains idle), a request to use the frequency channel may be transmitted again at block 1510. If, however, it is determined that the status has changed, at block 1525, a second determination may be made as to whether explicit assignment information is included in the broadcasted message. If assignment information is included, at block 1530, a third determination may be made as to whether the requested channel has been assigned to another M2M device. If it has been assigned to another device, the method 1500 may return to identify an idle channel to use at block 1505. If, however, it is determined that the channel has not been assigned to another device or if it is determined that explicit assignment information was not included in the broadcasted message, a data packet may be transmitted on the requested frequency channel at block 1535.

At block 1540, a broadcast of the channel status message may be received. At block 1545, a fourth determination may be made as to whether the status has transitioned to an idle status. If the status has not transitioned, the method 1500 may return to continue transmitting the data packet using the frequency channel at block 1535. If, however, it is determined that the status has changed from busy to idle, at block 1550 transmission of the data packet on the frequency channel may be terminated.

Therefore, the method 1500 may provide for selecting and requesting the use of frequency channel to transmit on the reverse link and terminating reverse link transmissions based on the status of the frequency channel. It should be noted that the method 1500 is just one implementation and that the operations of the method 1500 may be rearranged or otherwise modified such that other implementations are possible.

Techniques described herein may be used for various wireless communications systems such as M2M systems, cellular wireless systems, Peer-to-Peer wireless communications, wireless local access networks (WLANs), ad hoc networks, satellite communications systems, and other systems. The terms "system" and "network" are often used interchangeably. These wireless communications systems may employ a variety of radio communication technologies for multiple access in a wireless system such as Code Division Multiple Access (CDMA), Time Division Multiple Access (TDMA), Frequency Division Multiple Access (FDMA), Orthogonal FDMA (OFDMA), Single-Carrier FDMA (SC-FDMA), and/or other technologies. Generally, wireless communications are conducted according to a standardized implementation of one or more radio communication technologies called a Radio Access Technology (RAT). A wireless communications system or network that implements a Radio Access Technology may be called a Radio Access Network (RAN).

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for wireless communication in a machine-to-machine (M2M) wireless Wide Area Network (WAN), comprising:
   dividing an operating frequency band of the M2M wireless WAN into at least a first frequency channel and a second frequency channel, the first and second frequency channels being used for communications on a reverse link;
   broadcasting first channel status information and second channel status information to one or more M2M devices, the first channel status information indicating an idle status of the first frequency channel, the second channel status information indicating a status of the second frequency channel;
   receiving a request from a first M2M device to use the first frequency channel to transmit data on the reverse link; and
   transitioning the first channel status information from the idle status to indicate a busy status in response to the request.

2. The method of claim 1, wherein the status of the second frequency channel comprises the idle status or the busy status.

3. The method of claim 1, further comprising:
   assigning the first frequency channel to the first M2M device.

4. The method of claim 3, wherein assigning the first frequency channel comprises:
   broadcasting the transitioned first channel status information to the one or more M2M devices.

5. The method of claim 3, further comprising:
   receiving data from the first M2M device on the first frequency channel, the first frequency channel having the busy status;
   upon decoding the data received from the first M2M device, transitioning the first channel status information from the busy status to indicate the idle status for the first frequency channel; and
   broadcasting the transitioned first channel status information to the one or more M2M devices.

6. The method of claim 1, further comprising:
   receiving a request from at least a second M2M device to use the first frequency channel to transmit data on the reverse link, wherein at least two M2M devices are requesting to use the first frequency channel to transmit data on the reverse link, the first frequency channel having the idle status;
   selecting one of the at least two M2M devices; and
   assigning the first frequency channel to the selected one of the M2M devices.

7. The method of claim 6, wherein selecting one of the at least two M2M devices comprises:
   estimating a strength of the reverse link received from each of the at least two M2M devices; and
   selecting the one of the at least two M2M devices based in part on at least the estimated strength of the reverse link received from the selected M2M device.

8. The method of claim 6, wherein selecting one of the at least two M2M devices comprises:
   identifying an M2M device of the at least two M2M devices that most recently transmitted data on the reverse link; and
   selecting the one of the at least two M2M devices that most recently transmitted data on the reverse link.

9. The method of claim 6, wherein assigning the first frequency channel comprises:
   transitioning the first channel status information from the idle status to indicate the busy status;
   generating an assignment message identifying the selected M2M device; and
   broadcasting the transitioned first channel status information and the assignment message to the at least two M2M devices.

10. The method of claim 1, further comprising:
    identifying a first group of M2M devices, the first group of M2M devices receiving data on a forward link at a first data rate;
    identifying a second group of M2M devices, the second group of M2M devices receiving data on the forward link at a second data rate, the second data rate being greater than the first data rate; and
    identifying a third group of M2M devices, the third group of M2M devices receiving data on the forward link at a third data rate, the third data rate being greater than the second data rate.

11. The method of claim 10, further comprising:
    broadcasting channel status information for a first group of frequency channels to the first group of M2M devices at the first data rate, the channel status information being transmitted during at least a portion of a first time slot of a first forward link frame.

12. The method of claim 10, further comprising:
broadcasting channel status information for a second group of frequency channels to the second group of M2M devices at the second data rate, the channel status information being transmitted during at least a portion of a first time slot of a second forward link frame.

13. The method of claim 10, further comprising:
broadcasting channel status information for a third group of frequency channels to the third group of M2M devices at the third data rate, the channel status information being transmitted during at least a portion of a first time slot of a third forward link frame.

14. The method of claim 1, further comprising:
implementing frequency division multiple access (FDMA) for communications on the reverse link using the first and second frequency channels.

15. A base station configured for wireless communication on a reverse link in a machine-to-machine (M2M) wireless Wide Area Network (WAN), comprising:
a processor;
memory in electronic communication with the processor; and
instructions stored in the memory, the instructions being executable by the processor to:
divide an operating frequency band of the M2M wireless WAN into at least a first frequency channel and a second frequency channel, the first and second frequency channels being used for communications on the reverse link;
broadcast first channel status information and second channel status information to one or more M2M devices, the first channel status information indicating an idle status of the first frequency channel, the second channel status information indicating a status of the second frequency channel;
receive a request from a first M2M device to use the first frequency channel to transmit data on the reverse link; and
transition the first channel status information from the idle status to indicate a busy status in response to the request.

16. The base station of claim 15, wherein the status of the second frequency channel comprises the idle status or the busy status.

17. The base station of claim 15, wherein the instructions are further executable by the processor to:
assign the first frequency channel to the first M2M device.

18. The base station of claim 17, wherein the instructions executed by the processor to assign the first frequency channel are further executable by the processor to:
broadcast the transitioned first channel status information to the one or more M2M devices.

19. The base station of claim 17, wherein the instructions are further executable by the processor to:
receive data from the first M2M device on the first frequency channel, the first frequency channel having the busy status;
upon decoding the data received from the first M2M device, transition the first channel status information from the busy status to indicate the idle status for the first frequency channel; and
broadcast the transitioned first channel status information to the one or more M2M devices.

20. The base station of claim 15, wherein the instructions are further executable by the processor to:
receive a request from at least a second M2M device to use the first frequency channel to transmit data on the reverse link, wherein at least two M2M devices are requesting to use the first frequency channel to transmit data on the reverse link, the first frequency channel having the idle status;
select one of the at least two M2M devices; and
assign the first frequency channel to the selected one of the M2M devices.

21. The base station of claim 15, wherein the instructions are further executable by the processor to:
identify a first group of M2M devices, the first group of M2M devices receiving data on a forward link at a first data rate;
identify a second group of M2M devices, the second group of M2M devices receiving data on the forward link at a second data rate, the second data rate being greater than the first data rate; and
identify a third group of M2M devices, the third group of M2M devices receiving data on the forward link at a third data rate, the third data rate being greater than the second data rate.

22. An apparatus configured for wireless communication on a reverse link in a machine-to-machine (M2M) wireless Wide Area Network (WAN), comprising:
means for dividing an operating frequency band of the M2M wireless WAN into at least a first frequency channel and a second frequency channel, the first and second frequency channels being used for communications on the reverse link;
means for broadcasting first channel status information and second channel status information to one or more M2M devices, the first channel status information indicating an idle status of the first frequency channel, the second channel status information indicating a status of the second frequency channel;
means for receiving a request from a first M2M device to use the first frequency channel to transmit data on the reverse link; and
means for transitioning the first channel status information from the idle status to indicate a busy status in response to the request.

23. The apparatus of claim 22, wherein the status comprises the idle status or the busy status.

24. The apparatus of claim 22, further comprising:
means for assigning the first frequency channel to the first M2M device.

25. The apparatus of claim 24, further comprising:
means for broadcasting the transitioned first channel status information to the one or more M2M devices.

26. The apparatus of claim 24, further comprising:
means for receive data from the first M2M device on the first frequency channel, the first frequency channel having the busy status;
upon decoding the data received from the first M2M device, means for transitioning the first channel status information from the busy status to indicate the idle status for the first frequency channel; and
means for broadcasting the transitioned first channel status information to the one or more M2M devices.

27. The apparatus of claim 22, further comprising:
means for receiving a request from at least a second M2M device to use the first frequency channel to transmit data on the reverse link, wherein at least two M2M devices are requesting to use the first frequency channel to transmit data on the reverse link, the first frequency channel having the idle status;

means for selecting one of the at least two M2M devices; and means for assigning the first frequency channel to the selected one of the M2M devices.

28. The apparatus of claim 22, further comprising:

means for identifying a first group of M2M devices, the first group of M2M devices receiving data on a forward link at a first data rate;

means for identifying a second group of M2M devices, the second group of M2M devices receiving data on the forward link at a second data rate, the second data rate being greater than the first data rate; and means for identifying a third group of M2M devices, the third group of M2M devices receiving data on the forward link at a third data rate, the third data rate being greater than the second data rate.

29. A non-transitory computer readable medium for managing wireless communication on a reverse link in a machine-to-machine (M2M) wireless Wide Area Network (WAN), the non-transitory computer readable medium storing instructions executable by a processor to:

divide an operating frequency band of the M2M wireless WAN into at least a first frequency channel and a second frequency channel, the first and second frequency channels being used for communications on the reverse link;

broadcast first channel status information and second channel status information to one or more M2M devices, the first channel status information indicating an idle status of the first frequency channel, the second channel status information indicating a status of the second frequency channel;

receive a request from a first M2M device to use the first frequency channel to transmit data on the reverse link; and transition the first channel status information from the idle status to indicate a busy status in response to the request.

30. The non-transitory computer readable medium of claim 29, wherein the status comprises the idle status or the busy status.

31. The non-transitory computer readable medium of claim 29, wherein the instructions are further executable by the processor to:

assign the first frequency channel to the first M2M device.

32. The non-transitory computer readable medium of claim 31, wherein the instructions executed by the processor to assign the first frequency channel are further executable by the processor to:

broadcast the transitioned first channel status information to the one or more M2M devices.

33. The non-transitory computer readable medium of claim 31, wherein the instructions are further executable by the processor to:

receive data from the first M2M device on the first frequency channel, the first frequency channel having the busy status;

upon decoding the data received from the first M2M device, transition the first channel status information from the busy status to indicate the idle status for the first frequency channel; and broadcast the transitioned first channel status information to the one or more M2M devices.

34. The non-transitory computer readable medium of claim 29, wherein the instructions are further executable by the processor to:

receive a request from at least a second M2M device to use the first frequency channel to transmit data on the reverse link, wherein at least two M2M devices are requesting to use the first frequency channel to transmit data on the reverse link, the first frequency channel having the idle status;

select one of the at least two M2M devices; and assign the first frequency channel to the selected one of the M2M devices.

35. The non-transitory computer readable medium of claim 29, wherein the instructions are further executable by the processor to:

identify a first group of M2M devices, the first group of M2M devices receiving data on a forward link at a first data rate;

identify a second group of M2M devices, the second group of M2M devices receiving data on the forward link at a second data rate, the second data rate being greater than the first data rate; and identify a third group of M2M devices, the third group of M2M devices receiving data on the forward link at a third data rate, the third data rate being greater than the second data rate.

36. A method for wireless communication on a reverse link in a machine-to-machine (M2M) wireless Wide Area Network (WAN), comprising:

receiving a first broadcast of a channel status message from a base station, the channel status message indicating a status of a first frequency channel and a status of a second frequency channel, wherein the first frequency channel has an idle status;

transmitting a request to use the first frequency channel to transmit data on the reverse link;

receiving a second broadcast of the channel status message from the base station, the channel status message indicating the status of the first frequency channel and the status of the second frequency channel, wherein the status of the first frequency channel has transitioned from the idle status to a busy status; and determining whether to use the first frequency channel to transmit a data packet based at least in part on the status of the first frequency channel.

37. The method of claim 36, wherein determining whether to use the first frequency channel comprises:

determining whether the status of the first frequency channel has transitioned from the idle status to the busy status; and upon determining the status has transitioned to the busy status, transmitting the data packet using the first frequency channel.

38. The method of claim 36, wherein determining whether to use the first frequency channel comprises:

receiving channel assignment information, the channel assignment information comprising an explicit assignment of the first frequency channel; and transmitting the data packet using the first frequency channel based at least in part on the channel assignment information.

39. The method of claim 36, further comprising:

receiving a third broadcast of the channel status message, the channel status message indicating a transition of the status of the first frequency channel from the busy status to the idle status; and upon receiving the third broadcast indicating the transition of the status of the first frequency channel, terminating transmissions of the data on the reverse link using the first frequency channel.

40. The method of claim 36, wherein transmitting the request to use the first frequency channel comprises:

transmitting a preamble of the data packet.

* * * * *